(12) United States Patent
Nakagawa et al.

(10) Patent No.: US 10,906,330 B2
(45) Date of Patent: Feb. 2, 2021

(54) IMAGE FORMING METHOD, IMAGE FORMING DEVICE, AND METHOD OF MANUFACTURING PRINTED MATTER

(71) Applicants: Tomohiro Nakagawa, Kanagawa (JP); Hiroki Hagiwara, Kanagawa (JP); Yuki Kaji, Kanagawa (JP)

(72) Inventors: Tomohiro Nakagawa, Kanagawa (JP); Hiroki Hagiwara, Kanagawa (JP); Tatsuya Morita, Machida (JP); Yuki Kaji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/211,912

(22) Filed: Dec. 6, 2018

(65) Prior Publication Data
US 2019/0168516 A1    Jun. 6, 2019

(30) Foreign Application Priority Data

Dec. 6, 2017  (JP) ................................. 2017-234434
Jul. 20, 2018  (JP) ................................. 2018-136755
Oct. 10, 2018 (JP) ................................. 2018-192032

(51) Int. Cl.
*B41M 5/00* (2006.01)
*B41J 11/00* (2006.01)
(Continued)

(52) U.S. Cl.
CPC .......... *B41J 11/002* (2013.01); *B41M 5/0017* (2013.01); *B41M 7/009* (2013.01); *C09D 11/322* (2013.01); *C09D 11/40* (2013.01); *C09D 11/54* (2013.01); *B41M 5/0047* (2013.01); *B41M 5/0064* (2013.01)

(58) Field of Classification Search
CPC .... B41J 11/002; B41M 5/0017; B41M 7/009; B41M 5/0047; B41M 5/0064; C09D 11/322; C09D 11/40; C09D 11/54
See application file for complete search history.

(56) References Cited

U.S. PATENT DOCUMENTS

2013/0076842 A1*  3/2013  Sarkisian ............. B41M 5/0017
                                                 347/100
2013/0176369 A1*  7/2013  Gotou ..................... C09D 11/40
                                                 347/100
(Continued)

FOREIGN PATENT DOCUMENTS

EP     3 211 048 A1    8/2017
JP     2014-131855     7/2014
(Continued)

OTHER PUBLICATIONS

Extended European Search Report dated May 15, 2019 in European Patent Application No. 18209755.0, 11 pages.

*Primary Examiner* — Yaovi M Ameh
(74) *Attorney, Agent, or Firm* — Oblon, McClelland, Maier & Neustadt, L.L.P.

(57) ABSTRACT

An image forming method includes applying a pre-processing fluid to a non-permeable recording medium, jetting an ink to the non-permeable recording medium, and accelerating drying the pre-processing fluid applied to and the ink jetted to the non-permeable recording medium, wherein the pre-processing fluid contains a multivalent metal salt and a resin particle.

10 Claims, 3 Drawing Sheets

(51) Int. Cl.
*B41M 7/00* (2006.01)
*C09D 11/322* (2014.01)
*C09D 11/40* (2014.01)
*C09D 11/54* (2014.01)

(56) References Cited

U.S. PATENT DOCUMENTS

| | | |
|---|---|---|
| 2014/0192112 A1 | 7/2014 | Nagashima et al. |
| 2015/0077479 A1 | 3/2015 | Nakagawa et al. |
| 2015/0174939 A1* | 6/2015 | Aoyama ............. B41M 5/0017 347/21 |
| 2015/0259553 A1 | 9/2015 | Nakagawa et al. |
| 2015/0361282 A1 | 12/2015 | Nakagawa et al. |
| 2016/0068697 A1 | 3/2016 | Toda et al. |
| 2016/0272834 A1 | 9/2016 | Kobayashi et al. |
| 2016/0355695 A1 | 12/2016 | Nakagawa et al. |
| 2017/0022380 A1 | 1/2017 | Nakagawa et al. |
| 2017/0051170 A1 | 2/2017 | Nakagawa et al. |
| 2017/0121545 A1 | 5/2017 | Nagashima et al. |
| 2017/0247561 A1 | 8/2017 | Nakagawa et al. |

FOREIGN PATENT DOCUMENTS

| | | |
|---|---|---|
| JP | 2016-050277 | 4/2016 |
| JP | 2018-094902 | 6/2018 |
| WO | WO 2011/159274 A1 | 12/2011 |

* cited by examiner

IMAGE FORMING METHOD, IMAGE FORMING DEVICE, AND METHOD OF MANUFACTURING PRINTED MATTER

CROSS-REFERENCE TO RELATED APPLICATIONS

This patent application is based on and claims priority pursuant to 35 U.S.C. § 119 to Japanese Patent Application Nos. 2017-234434, 2018-136755, and 2018-192032, filed on Dec. 6, 2017, Jul. 20, 2018, and Oct. 10, 2018, respectively, in the Japan Patent Office, the entire disclosures of which are hereby incorporated by reference herein.

BACKGROUND

Technical Field

The present disclosure relates to an image forming method, an image forming device, and a method of manufacturing printed matter.

Description of the Related Art

An image forming method of forming an image on a non-permeable recording medium such as a plastic film is known, and an ink for that purpose has been developed. For example, inkjet ink is directly applied to plastic film used to pack food and articles of daily use. Since such printed plastic film is viewed in a close range in many occasions, it requires extremely high image quality. However, inkjet ink remains on an inkjet-printed non-permeable recording medium. Therefore, ink droplets may excessively spread, causing oozing and color mixture (color bleed) between adjacent droplets.

To handle this problem, an image forming method including pre-processing fluid application onto a non-permeable recording medium before ink application has been proposed. For example, an image forming method including pre-processing fluid application has been proposed, which includes discharging inkjet ink to a recording medium and applying post-processing fluid to the inkjet ink applied surface.

In addition, a print method has been proposed, which includes applying a pre-processing fluid to fabric and attaching an aqueous inkjet ink composition onto the pre-processing fluid applied fabric area.

SUMMARY

According to the present invention, provided is an improved image forming method which includes applying a pre-processing fluid to a non-permeable recording medium, jetting an ink to the non-permeable recording medium, and accelerating drying the pre-processing fluid applied to and the ink jetted to the non-permeable recording medium, wherein the pre-processing fluid contains a multivalent metal salt and a resin particle.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
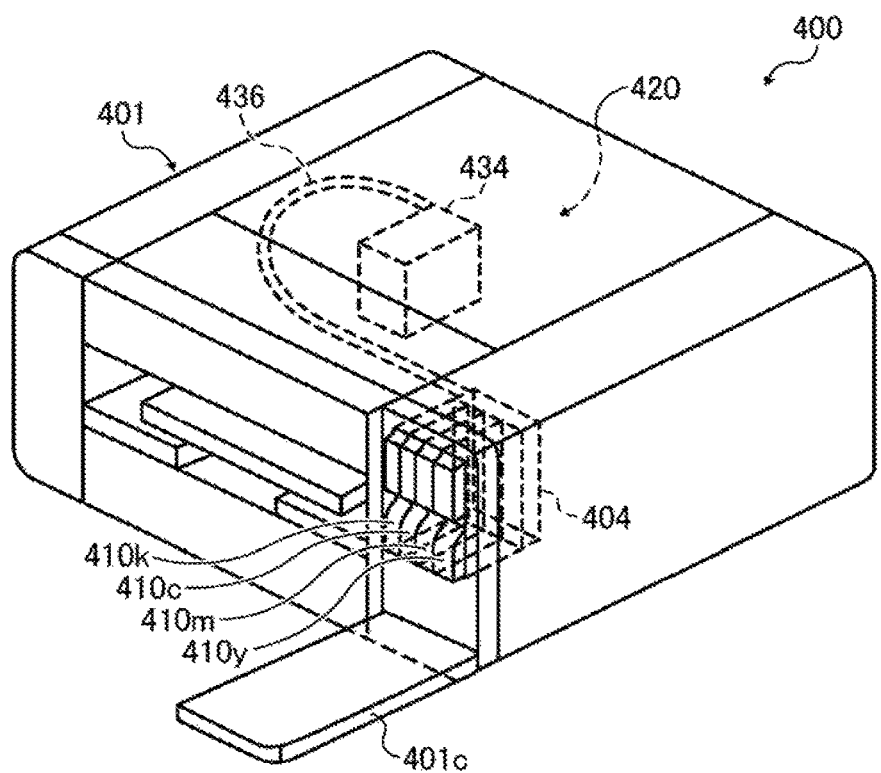
FIG. 1 is a schematic diagram illustrating a perspective view of an example of an ink discharging device.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Image Forming Method and Image Forming Apparatus

The image forming method according to the present disclosure includes applying a pre-processing fluid to a non-permeable recording medium, jetting an ink to the non-permeable recording medium where the pre-processing fluid is attached undried by an inkjet method, and accelerating drying the pre-processing fluid applied to and the ink jetted to the non-permeable recording medium, wherein the pre-processing fluid contains a multivalent metal salt and a resin particle. It preferably includes a surface-reforming and other optional process.

The image forming device according to the present disclosure includes a pre-processing fluid applying device to apply a pre-processing fluid to a non-permeable recording medium, an inkjet device to jet an ink to the non-permeable recording medium where the pre-processing fluid is attached undried by an inkjet method; and a drying accelerating device to accelerate drying the pre-processing fluid applied to and the ink jetted to the non-permeable recording medium, wherein the pre-processing fluid contains a multivalent metal salt and a resin particle. It preferably includes a surface-reforming device and other optional devices.

In typical image forming methods, when ink is applied by an inkjet method onto an impermeable recording medium where a pre-processing fluid is applied undried, a drying step of drying the pre-processing liquid and a drying step of drying the ink are required, which causes a configuration problem such as the size of the image forming device.

In addition, in typical image forming methods, when ink is applied by an inkjet method onto a non-permeable recording medium where a pre-processing fluid is applied undried, problems such as oozing and color mixing (color bleed) with an adjacent ink occur.

Moreover, in typical image forming methods, when ink is applied by an inkjet method onto a non-permeable recording medium where a pre-processing fluid is applied undried, the ink does not sufficiently wet-spread or a formed solid image cracks due to the ink flowing from the solid image so that the thus-obtained printed matter has low solid filling property.

The present inventors have found that the image forming method of the present disclosure solves these problems.

As a result of an investigation made by the present inventors, the present inventors have found that, due to the image forming method of the present disclosure including applying a pre-processing fluid to a non-permeable recording medium, jetting an ink to the non-permeable recording medium where the pre-processing fluid is attached undried by an inkjet method, and accelerating drying the pre-processing fluid and the ink on or in the non-permeable recording medium, wherein the pre-processing fluid contains a multivalent metal salt and a resin particle, quality images can be formed with less color bleed and good solid filling property even when ink is applied onto a non-permeable recording medium where a pre-processing fluid is attached undried.

In addition, it was found that the image forming method of the present disclosure can form a higher quality image as compared with cases where ink is applied onto a non-permeable recording medium where pre-processing fluid is applied dried. This is because the pigment contained in the ink reacts with the multivalent metal salt contained in the pre-processing fluid immediately after the ink is applied onto the non-permeable recording medium where the pre-processing fluid is applied undried, so that the pigment agglomerates and flowability of the pre-processing fluid changes after the reaction with the ink due to the inclusion of resin particle in the pre-processing fluid, thereby lowering flowability of non-reacted pre-processing fluid. Conversely, in cases where the pre-processing fluid does not contain a multivalent metal salt, oozing and color bleed occur. Furthermore, in cases where the pre-processing fluid does not contain a resin particle, the ink flows from a formed solid image 5 to 20 seconds after the ink is applied, that is, solid image filling property deteriorates. In addition, without the step of accelerating drying the pre-processing fluid and the ink applied to the non-permeable recording medium, flowability of the pre-processing fluid is high after the reaction with the ink so that the ink flows from a formed solid image, that is, solid image filling property deteriorates.

Pre-processing Fluid Applying Process and Pre-processing Fluid Applying Device

The pre-processing fluid applying process is to apply the pre-processing fluid to a non-permeable recording medium.

Pre-processing Fluid

The pre-processing fluid contains a multivalent metal salt and resin particles. It preferably contains water and optionally other components.

Multivalent Metal Salt

The multivalent metal salt contained in the pretreatment liquid quickly coagulates the pigment contained in the ink when the ink is applied on the non-permeable recording medium, so that the color mixing of the adjacent inks (color bleed) can be diminished and the coloring property can be enhanced.

The multivalent metal salt has no specific limit and can be suitably selected to suit to a particular application. Examples are salts of multivalent metal compounds.

The multivalent metal compound has no specific limit and can be suitably selected to suit to a particular application. Examples are titanium compounds, chromium compounds, copper compounds, cobalt compounds, strontium compounds, barium compounds, iron compounds, aluminum compounds, calcium compounds, magnesium compounds, and nickel compounds. These can be used alone or in combination.

Of these, calcium compounds, magnesium compounds and nickel compounds are preferable in terms of aggregating a pigment in ink, and calcium compounds and magnesium compounds are more preferable.

As the multivalent metal salt, an ionic multivalent metal salt is preferable.

The multivalent metal salt has no specific limit and can be suitably selected to suit to a particular application. Examples are divalent metal salts and a trivalent metal salts. Of these, divalent metal salts are preferable. When the multivalent metal salt is a divalent metal salt, a high quality image can be formed because the pigment contained in ink has excellent aggregation ability.

Examples of the divalent metal salt include calcium salts, magnesium salts, and nickel salts. Of these, calcium salts and magnesium salts are preferable, and calcium salts are more preferable in terms of storage stability in the pre-processing fluid.

A specific example of the trivalent metal salt is an aluminum salt.

Specific examples of the calcium salt include, but are not limited to, calcium nitrate, calcium chloride, and calcium acetate.

Specific examples of the magnesium salt include, but are not limited to, magnesium nitrate, magnesium chloride, magnesium sulfate, and magnesium acetate.

A specific example of the nickel salt is nickel chloride.

A specific example of the aluminum salt is aluminum nitrate.

These can be used alone or in combination. In addition, these may be anhydrides or hydrates.

The concentration of the multivalent metal salt is preferably from 0.05 to 0.5 mol/kg to the total amount of the pre-processing fluid. When the concentration is from 0.05 to 0.5 mol/kg, storage stability is excellent and color bleed can be diminished.

Resin Particle

Inclusion of the resin in the pre-processing fluid diminishes ink flowing from a formed solid image 20 seconds or more after the ink application. Also, cracking of a solid image is reduced, thereby contributing to enhancement of solid image filling property.

The resin particle has no particular limit and can be suitably selected to suit to a particular application. Examples are urethane resin particles, acrylic resin particles, polyolefin resin particles, vinyl acetate resin particles, styrene butadiene resin particles, polyester resin particles, styrene resin particles, butadiene resin particles, vinyl chloride resin particles, acrylic styrene resin particles, and acrylic silicone resin particles. These can be used alone or in combination.

In terms of viscosity of the pre-processing fluid and the formation of a high quality image on a non-permeable recording medium, the resin particle is preferably at least one of a urethane resin particle having a glass transition temperature (hereinafter also referred to as Tg) of 20 degrees C. or lower, an acrylic resin particle having a glass transition temperature of 20 degrees C. or lower, and a polyolefin resin particle having a glass transition temperature of 20 degrees C. or lower. Of these, a urethane resin particle having a glass transition temperature of 20 degrees C. or lower and an acrylic resin particle having a glass transition temperature of 20 degrees C. or lower are more preferable. When the resin particle is at least one of a urethane resin particle having a glass transition temperature of 20 degrees C. or lower and an acrylic resin particle having a glass transition temperature of 20 degrees C. or lower, the ink flowing from a solid image is diminished, thereby enhancing solid image filling property, which leads to formation of quality images.

Also, at least one of a urethane resin particle having a glass transition temperature of −50 degrees C. or higher, an acrylic resin particle having a glass transition temperature of −50 degrees C. or higher, and a polyolefin resin particle having a temperature of −50 degrees C. or higher is preferable as the resin particle in terms of reducing blocking of the pre-processing fluid.

The proportion of the resin particle is not particularly limited and can be suitably selected to suit to a particular application. Preferably, it is from 0.9 to 21 percent by mass and more preferably from 1 to 20 percent by mass to the total amount of the pre-processing fluid. When the proportion of the resin particle to the total amount of the pre-processing fluid is 0.9 percent by mass or more, the ink flowing from a solid image is diminished, thereby enhancing solid image filling property, which leads to formation of quality images. When the proportion of the resin particle to the total amount of the pretreatment liquid is 21 percent by mass or lower, aggregation of the multivalent metal salt contained in the pre-processing fluid and the pigment contained in ink is not easily inhibited by the resin particle, so that quality images can be formed, which is preferable. The proportion of the resin particle is possibly from 5 to 20 percent by mass.

Water

There is no specific limitation to the water and it can be suitably selected to suit to a particular application. For example, pure water such as deionized water, ultrafiltered water, reverse osmosis water, and distilled water and ultra pure water are suitable. These can be used alone or in combination.

Other Components

Examples of the other components are organic solvents, surfactants, defoaming agents, preservatives and fungicides, and corrosion inhibitors.

Organic solvents, surfactants, defoaming agents, preservatives and fungicides, and corrosion inhibitors for use in known processing fluid can be used.

Organic Solvent

There is no specific limitation on the type of the organic solvent used in the present disclosure. For example, water-soluble organic solvents are suitable. Examples are polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkyl ethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The proportion of the organic solvent is not particularly limited and can be suitably selected to suit to a particular application. For example, it is preferably from 10 to 60 percent by mass and more preferably from 20 to 60 percent by mass.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

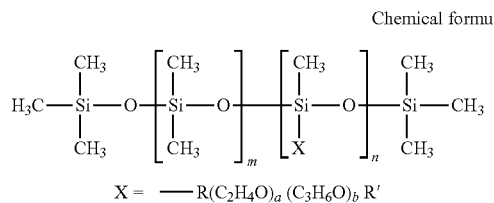

$X = $ —$R(C_2H_4O)_a (C_3H_6O)_b R'$

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-21.05, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK-Chemie GmbH), and TSF4440, TSF4452, and TSF4453 (all manufactured by Momentive Performance Materials Inc.)

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not easily foam and the fluorosurfactant represented by the following Chemical formula F-1 or Chemical formula F-2 is particularly preferable.

$CFCF_2(CF_2CF_2)_m$—
$CH_2CH_2O(CH_2CH_2O)_nH$    Chemical formula F-1

In the compound represented by Chemical formula F-1, m is preferably 0 or an integer of from 1 to 10 and n is preferably 0 or an integer of from 1 to 40.

$C_nF_{2n+1}$—$CH_2CH(OH)CH_2$—O—
$(CH_2CH_2O)_a$—Y    Chemical formula F-2

In the compound represented by Chemical formula F-2, Y represents H, $C_mF_{2m+1}$, where in represents an integer of from 1 to 6, $CH_2CH(OH)CH_2$—$C_mF_{2m+1}$, where m represents an integer of from 4 to 6, or $C_pH2p+1$, where p is an integer of from 1 to 19, "n" represents an integer of from 1 to 6. "a" represents an intmer of from 4 to 14.

As the fluorochemical surfactant, products available on the market may be used, Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYLTM TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation to paper, wettability, and uniform dying property.

The proportion of the surfactant is not particularly limited and can be suitably selected to suit to a particular application. For example, it is preferably from 0.001 to 5 percent by mass and more preferably from 0.05 to 5 percent by mass in terms of enhancement of image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

There is no specific limit to the method of applying the pre-processing fluid and it can be suitably selected to suit to a particular application. Specific examples include, but are not limited, an inkjet method, a blade coating method, a gravure coating method, a gravure offset coating method, a bar coating method, a roll coating method, a knife coating method, an air knife coating method, a comma coating method, a U comma coating method, an AKKU coating method, a smoothing coating method, a microgravure coating method, a reverse roll coating method, a four or five roll coating method, a dip coating method, a curtain coating method, a slide coating method, and a die coating method. The application method can be appropriately selected according to the material, thickness, etc. of the non-permeable recording medium.

The application amount of the pre-processing fluid has no particular limit and can be suitably selected to suit to a particular application. For example, the specific application amount is preferably from 0.5 to 6.3 $g/m^2$, more preferably from 1 to 6 $g/m^2$, and furthermore preferably from 2 to 4 $g/m^2$. When the application amount of the pre-processing fluid is from 0.5 to 6.3 $g/m^2$, the aggregation ability of the multivalent metal salt of the pre-processing fluid and the ink pigment and the diminishing ability of the ink flowing from a solid image by the resin particle in the pre-processing fluid strike a balance, which makes it possible to form a high quality image.

Non-Permeable Recording Medium

The non-permeable recording medium has a surface with low moisture permeability, absorbency, and/or adsorptive property and includes a material having myriad of inner hollow spaces not open to the exterior.

To be more quantitative, the non-permeable recording medium has a water-absorption amount of 10 $mL/m^2$ or less between the initiation of contact and 30 $msec^{1/2}$ thereafter according to Bristow method.

The non-permeable recording medium are not particularly limited and can be suitably selected to suit to a particular application. Examples are plastic film, a building material, and metal.

Specific examples include, but are not limited to, polycarbonate film, vinyl chloride resin film, polypropylene film, polyethylene terephthalate (PET) film, nylon film, and polyethylene film. Of these, polypropylene film, polyethylene terephthalate film, and nylon film are preferable in terms of adhesion.

A specific example of the polypropylene film is biaxially oriented polypropylene film.

Specific examples of the building material include, but are not limited to, wallpaper, a floor material, tile, ceramics, and glass. These can be used alone or in combination.

The non-permeable recording medium is available on the market.

There is no specific limitation to the product available on the market and it can be suitably selected to suit to a particular application.

Specific examples include, but are not limited to, polypropylene film (P-2002, manufactured by TOYOBO CO., LTD.), polypropylene film (P-2161, manufactured by TOYOBO CO., LTD.), polypropylene film (P-4166, manufactured by TOYOBO CO., LTD.), polypropylene film (PA-20, manufactured by SUNTOX Corporation), polypropylene film (PA-30, manufactured by SUNTOX Corporation), polypropylene film (PA-20W, manufactured by SUNTOX Corporation), polypropylene film (FOA, manufactured by Futamura Chemical Co., Ltd.), polypropylene film (FOS, manufactured by Futamura Chemical Co., Ltd.), polypropylene film (FOR, manufactured by Futamura Chemical Co., Ltd.), polyethylene terephthalate film (E-5100, manufactured by Toyobo Co., Ltd.), polyethylene terephthalate film, polyethylene terephthalate film (E-5102, manufactured by Toyobo Co., Ltd.), polyethylene terephthalate film (P60, manufactured by Toray Industries, Inc.), polyethylene terephthalate film (P375, manufactured by Toray Industries, Inc.), polyethylene terephthalate film (G2, manufactured by Teijin DuPont Films Japan Limited), polyethylene terephthalate film (G2P2, manufactured by Teijin DuPont Films Japan Limited), polyethylene terephthalate film (K, manufactured by Teijin DuPont Films Japan Limited), polyethylene terephthalate film (SL, manufactured by Teijin DuPont Films Japan Limited), nylon film (Harden film N-1100, manufactured by Toyobo Co., Ltd.), nylon film (Harden film N-1102, manufactured by Toyobo Co., Ltd.), nylon film (Harden film N-1200, manufactured by TOYOBO CO., LTD.), nylon film (ON, manufactured by UNITIKA LTD.), nylon film (NX, manufactured by UNITIKA LTD.), nylon film (MS, manufactured by UNITIKA LTD.), and nylon film (NK, manufactured by UNITIKA LTD.).

Ink Applying Process and Ink Applying Device

In the ink application step, ink is applied to the non-permeable recording medium on which the pre-processing fluid is applied undried by an inkjet method. The ink application is executed by an ink application device.

"Undried" means a state of the pre-processing fluid being not dried but wet on a non-permeable recording medium. However, all of the solvents do not necessarily evaporate. The state includes when the solvents partially evaporate.

In the present disclosure, in order to cause the pre-processing fluid undried, the ink is applied immediately after the pre-processing fluid is applied. That is, the pre-processing fluid application step is not followed by drying. Specifically, the time between the pre-processing fluid application and the ink application is preferably 10 seconds or less and more preferably 3 seconds or less.

This ink application on a non-permeable recording medium where the pre-processing fluid is applied undried makes it possible to diminish color bleed regardless of the kind of the non-permeable recording medium, thereby obtaining good images having solid image filling property.

Ink

The ink preferably contains a coloring material, an organic solvent, water, and a resin. It may furthermore optionally contain other components.

Coloring Material

The coloring material has no specific limit and is suitably selected to suit to a particular application. For example, pigments and dyes are usable.

As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

The dye is not particularly limited and includes, for example, acidic dyes, direct dyes, reactive dyes, basic dyes. These can be used alone or in combination.

Specific preferred examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the color pigments include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency in the maximum number conversion is preferably 20 to 500 nm and more preferably 20 to 150 nm to improve dispersion stability of the pigment and ameliorate discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

The method of dispersing a pigment in ink include, for example, a method of forming a self-dispersible pigment in which a hydrophilic functional group is introduced into the pigment, a method of forming a resin coated pigment in which the surface of the pigment is coated with a resin, and a method of forming a dispersant-dispersing pigment using a dispersant.

The method of forming a self-dispersible pigment in which a hydrophilic functional group is introduced into the pigment is not particularly limited and can be suitably selected to suit to a particular application. For example, it includes a method of adding a functional group such as a sulfolane group and a carboxyl group to a pigment such as carbon to be dispersible in a solvent such as water.

The method of forming a resin-coated pigment in which the surface of the pigment is coated with a resin is not particularly limited and can be suitably selected to suit to a particular application. For example, it includes a method of enclosing a pigment with a microcapsule, etc., to be dispersible in a solvent such as water.

The resin does not necessarily cover all over but partially the pigment.

The method of forming a dispersant-dispersing pigment using a dispersant is not particularly limited and can be suitably selected to suit to a particular application. For example, it includes a method of causing a pigment to be dispersible in a solvent such as water using a known dispersant.

In terms of reactivity with a pre-processing fluid, the dispersant is not particularly limited as long as it is an anionic dispersant, and can be suitably selected to suit to a particular application. For example, low molecular weight dispersant and high molecular weight dispersant are selectable. These can be used alone or in combination.

An example of the low-molecular weight dispersant is a surfactant.

Organic Solvent

The organic solvent has no particular limit and can be suitably selected to suit to a particular application.

For example, the same organic solvent as that in the pre-processing fluid can be used.

Of these, 1,2-propanediol, 1,2-butanediol, and 2,3-butanediol are preferable in terms of enhancing film-forming property of a resin and improving abrasion resistance.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

The water mentioned above has no particular limit and can be suitably selected to suit to a particular application.

For example, the same water as that in the pre-processing fluid can be used.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles formed of such resins may be also used. It is possible to mix a resin emulsion in which the resin particles are dispersed in water as a dispersion medium with materials such as a coloring material and an organic solvent to obtain an ink. It is possible to use a suitably-synthesized resin particle. Alternatively, the resin particle is available on the market. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total amount of the ink.

The particle diameter of the solid portion in ink is not particularly limited and can be suitably selected to suit to a particular application. For example, the maximum frequency in the maximum number conversion is preferably 20 to 1,000 nm and more preferably 20 to 150 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Other Components

Examples of the other component are surfactants, defoaming agents, preservatives and fungicides, corrosion inhibitors, and pH regulators.

Surfactant

The surfactant has no particular limit and can be suitably selected to suit to a particular application.

For example, the same surfactant as that in the pre-processing fluid can be used.

Defoaming Agent

The defoaming agent has no particular limit and can be suitably selected to suit to a particular application.

For example, the same defoaming agent as that in the pre-processing fluid can be used.

Preservatives and Fungicides

The preservatives and fungicides has no particular limit and can be suitably selected to suit to a particular application.

For example, the same preservatives and fungicides as those in the pre-processing fluid can be used.

Corrosion Inhibitor

The corrosion inhibitor has no particular limit and can be selected to suit to a particular application.

For example, the same corrosion inhibitor as that in the pre-processing fluid can be used.

pH Regulator

The pH regulator has no particular limit as long as it can control pH to not lower than 7. Specific examples include, but are not limited to, amines such as diethanol amine and triethanol amine.

The ink can be prepared by dispersing or dissolving these components in, for example, water as a solvent, optionally followed by stirring and mixing.

A stirrer using a typical stirring blade, a magnetic stirrer, a high performance disperser etc., can be used for the mixing and stirring.

Properties of the ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO. LTD.). The measuring conditions are as follows:

Standard cone rotor (1°34'×R24)
Sample liquid amount: 1.2 mL
Number of rotations: 50 rotations per minute (rpm)
2 5° degrees C.
Measuring time: three minutes The surface tension of the ink is preferably 35 mN/m or less and more preferably 32 mN/m or less at 25 degrees C. in terms that the ink is preferably and suitably leveled on a recording medium and the drying time of the ink is shortened.

pH of the ink is preferably from 7 to 12 and more preferably from 8 to 11 in terms of prevention of corrosion of metal material in contact with liquid.

As an ink application method, an ink jet method is used.

To form quality images having an excellent solid image filling property while reducing color bleed, the application amount of the ink when forming a solid image is preferably from 4 to 14 g/m², more preferably from 7 to 14 g/m².

When printed with small droplet ink, it is preferable to reduce the application amount of the ink.

Process of Accelerating Drying and Device for Accelerating Drying

The step of accelerating drying accelerates drying of the pre-processing fluid and the ink applied to the non-permeable recording medium and is not limited to drying by heat but includes non-heat drying such as ventilation and blowing. It is preferable to accelerate drying by a drying device using a heating device.

The drying device is not particularly limited and can be suitably selected to suit to a particular application. Examples include hot air drying, drying by infrared heating, drying by radiation heating, drying by conduction heating, high frequency drying, and microwave drying. These can be used alone or in combination.

In the cases of drying by hot air drying or infrared heating, volatile components in the ink efficiently volatilize after the ink is applied to the non-permeable recording medium, so that robustness of the film by the ink applied to the permeable recording medium is improved.

The drying temperature during the accelerating drying is preferably from 40 to 100 degrees C. and more preferably from 50 to 90 degrees C. When the drying temperature is in the range of from 40 to 100 degrees C., damage to a non-permeating recording medium due to heat can be prevented and non-discharging ascribable to a heated ink discharging head can be reduced.

It is preferable that intensity of drying in the accelerating drying be suitably determined in accordance with thickness of a non-permeable recording medium and heat contraction properties of material.

Surface Reforming Process and Surface Reforming Device

The image forming method preferably includes surface reforming.

The surface reforming reforms the surface of the non-permeable recording medium and is conducted by a surface-reforming device. Due to this surface reforming to the non-permeable recording medium, the pre-processing fluid can be uniformly applied to the non-permeable recording medium and also adhesion property can be enhanced.

The surface reforming device can be mounted inside or outside of an image forming device. However, in terms of handling caused by machine separation, it is preferable to provide it inside.

The surface reforming is not particularly limited and can be suitably selected to suit to a particular application. Examples include corona treatment, atmospheric pressure plasma treatment, frame treatment, and ultraviolet irradiation treatment. Of these, to make output stability excellent and uniformly conduct the surface treatment on the recording surface, corona treatment is preferable.

As the non-permeable recording medium, articles finished with corona treatment available on the market can be used. However, to stably apply the pre-processing fluid, it is preferable to conduct corona treatment again immediately before the pre-processing fluid is applied to the non-permeable recording medium.

Other Optional Process

An example of the aforementioned other processes is a process of applying a post-processing fluid.

Process of Applying Post-Processing Fluid

The image forming method may include a post-processing fluid application of applying a post-processing fluid onto a non-permeable recording medium where the ink and the pre-processing fluid are applied.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

Method of Manufacturing Printed Matter

In the method of manufacturing printed matter of the present disclosure, images are printed on non-permeable recording media utilizing the image forming method of the present disclosure.

The printed material produced by the method of manufacturing printed matter diminishes color bleed and enhances solid image filling property.

Recorded Matter

The ink recorded matter of the present disclosure includes a recording medium and an image formed on the recording medium with the ink of the present disclosure.

By recording according to an inkjet recording device and an inkjet recording method, the recorded matter is obtained.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing fluids, etc. to a recording medium and a method of recording utilizing the device. The recording medium means an article to which ink or various processing fluids can be attached temporarily or permanently.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll-like form as a recording medium.

Figure 2:
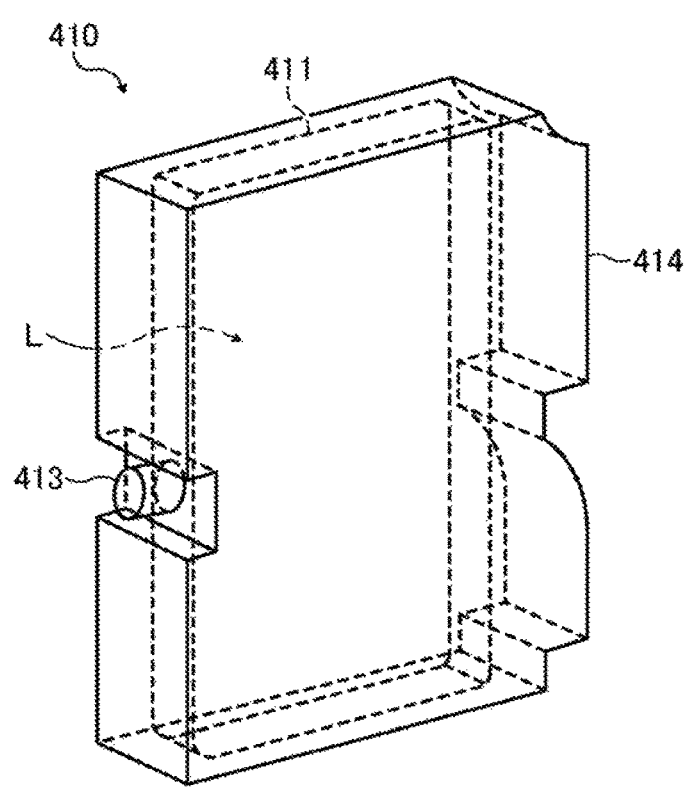
FIG. 2 is a diagram illustrating a perspective view of an example of the main tank of the ink discharging device.

The recording device is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The cartridge holder 404 is detachably attached to the main tank 410.

This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid and a liquid discharging head to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Figure 3A:
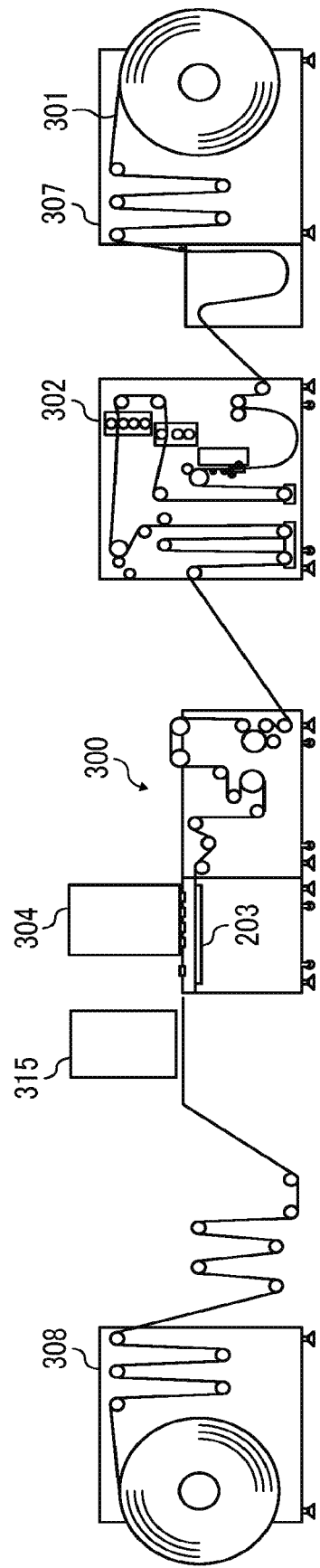
FIGS. 3A and 3B are respectively schematic diagrams illustrating examples of the image forming apparatus with or without a post-processing fluid applying device according to an embodiment of the present disclosure.
Figure 3B:
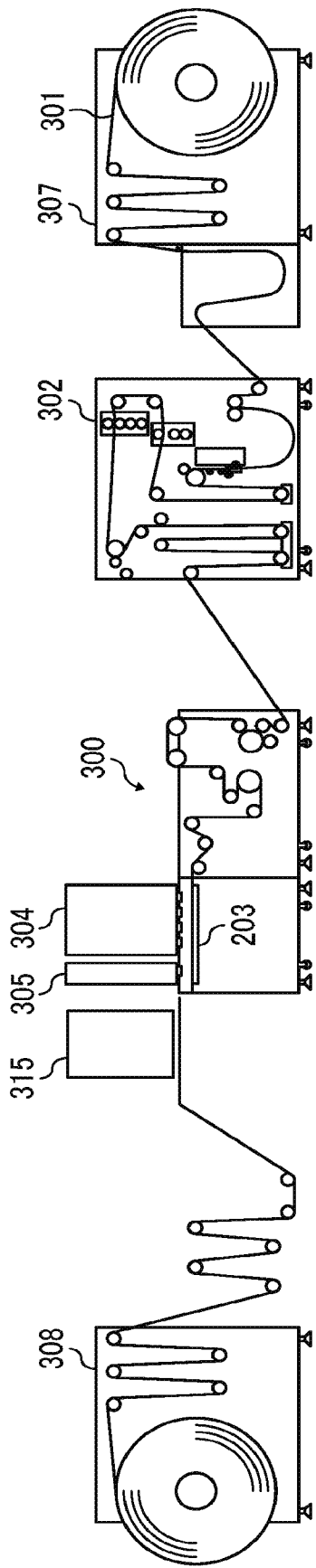
Figure 4:
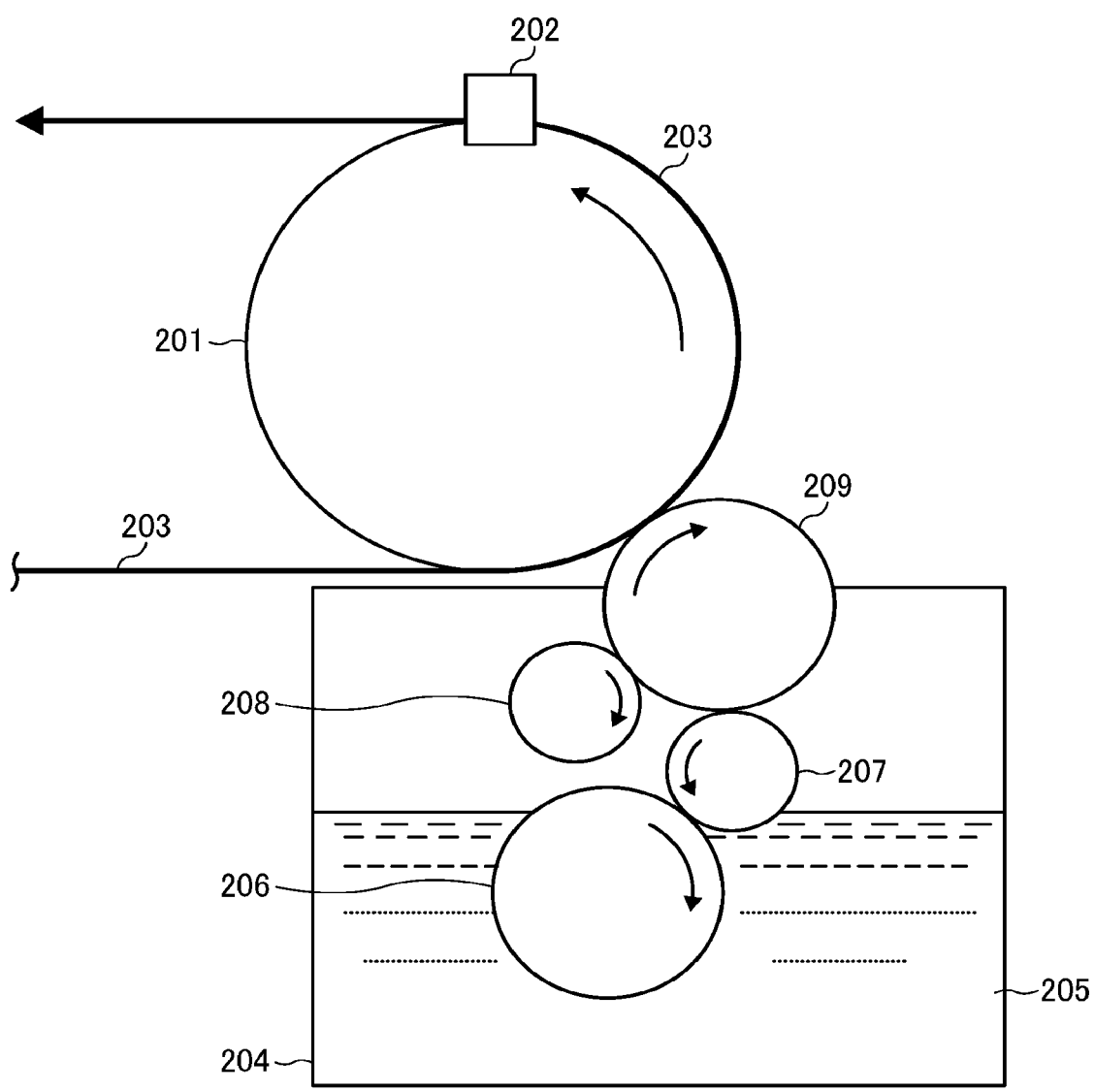
FIG. 4 is a schematic diagram illustrating a pre-processing fluid application device of the pre-processing unit illustrated in FIGS. 3A and 3B.

Next, the image forming device including the pre-processing fluid application device illustrated in FIG. 3 and the pre-processing fluid application device of the pre-processing unit illustrated in FIG. 4 are described.

An image forming apparatus 300 includes a recording medium conveyance unit 301, a pre-processing unit 302 to apply a pre-processing fluid to a recording medium 203, an inkjet recording unit 304 to form an image on the recording medium 203 by discharging an aqueous pigment ink thereto, and a drying accelerating device 315 to accelerate drying the recording medium 203.

The recording medium conveyance unit 301 has a sheet feeder 307, multiple conveyor rollers, and a reeling unit 308. The recording medium 203, which is continuous roll paper, is reeled out from the sheet feeder 307 by the conveyance rollers, and thereafter reeled up by the reeling unit 308.

The recording medium 203 conveyed from the recording medium conveyance unit 301 is coated with the pre-processing fluid by the pre-processing fluid application unit 204 (illustrated in FIG. 4) of the pre-processing unit 302.

As illustrated in FIG. 4, a pre-processing fluid 205 is accommodated inside the pre-processing fluid application unit 204. In this unit, a thin film of the pre-processing fluid 205 is formed on the surface of an application roller 209 by a stirring and supplying roller 206, a conveyance roller 207, and a thin film forming roller 208. Thereafter, the application roller 209 is caused to rotate pressed against a rotatable counter roller 201 which is rotating and the recording medium 203 passes between the application roller 209 and the rotatable counter roller 201. At this nip, the pre-processing fluid 205 is applied to the surface of the recording medium 203. At this point, a pressure controller 202 adjusts the nip pressure between the counter roller 201 and the application roller 209 to control the application amount of the pre-processing fluid 205. In addition, it is also possible to adjust the application amount of the pre-processing fluid 205 by controlling the rotation speed of the counter roller 201 and the application roller 209. The application roller 209 and the counter roller 201 are driven by a power supply such as drive motor. The rotation speed of the application roller 209 and the counter roller 201 can be controlled by adjusting the energy of the power supply.

By using the application roller 209 to apply the pre-processing fluid 205 to the recording area of the recording medium 203, the pre-processing fluid 205 having a relatively high viscosity can be thinly applied to the recording medium 203 to further reduce occurrence of uneven coloring.

The application method in the pre-processing unit 302 is not limited to the roll coating method. Other specific methods are, for example, blade coating method, gravure coating method, gravure offset coating method, bar code method, and roll coating method.

The pre-processing fluid 205 can be applied to the entire recording area of the recording medium 203 or only the area to which an image is formed.

An image is formed on the recording medium 203 onto which the pre-processing fluid 205 is applied by an inkjet recording unit 304 in accordance with image data.

The inkjet recording unit 304 is a full-line type head including four inkjet heads 304K, 394C, 304M, and 304Y of black K, cyan C, magenta M, and yellow Y, respectively, arranged in this order from upstream of the conveyance direction of the recording medium 203.

The nozzle array can be multiple.

The other heads 304C, 304M, and 304Y have the same configurations and the four inkjet heads 304K, 304C, 304M, and 304Y are arranged along the conveyance direction spaced the same distance therebetween. For this reason, an image can be formed on the whole width of the entire recording area by a single recording operation.

A post-processing fluid is optionally applied by the post-processing unit 305 to the recording medium 203 on which an image is formed. FIG. 3A is a diagram illustrating a configuration including a post-processing fluid unit and FIG. 3B is a diagram illustrating a configuration without a post-processing fluid unit.

The post-processing fluid forms a transparent protection layer on the recording medium 203 on which the image is formed.

The post-processing fluid can be applied to the entire recording area of the recording medium 203 or only the area to which the image is formed.

The recording medium 203 on which an image is formed or the recording medium 203 to which the post-processing fluid is applied is dried by a drying accelerating device 315 to accelerate drying. Examples of the drying accelerating device are, devices utilizing heated wind drying, infrared heating, and a heat roller. Of these, hated drying and infrared heating are preferable.

The dried recording medium 203 is reeled up by the reeling unit 308.

It is optional to provide a prior-to-reeling drying unit to dry the recording medium 203 before the recording medium 203 is reeled up by the reeling unit 308.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

An apparatus for manufacturing a solid freeform fabrication to fabricate a three-dimensional solid object can be any known device with no particular limit. For example, the apparatus includes an ink container, a supplying device, and a discharging device, a drier, etc. The three-dimensional solid object includes an object manufactured by repeated ink coating. In addition, the three-dimensional solid object includes a molded processed product manufactured by processing a structure having a substrate such as a recording medium to which the ink is applied. The molded processed product is fabricated from printed matter or a structure having a sheet-like form, film-like form, etc. by, for example, heating drawing or punching.

The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1 of Resin Emulsion

Urethane Resin Emulsion B

First, 0.1 mol of a diisocyanate compound obtained by reacting 1.4 mol of dicyclohexylmethane diisocyanate with 1 mol of 1,6-hexanediol, 0.1 mol of a diisocyanate compound obtained by reacting 1 mol of isocyanurate trimer of 1,6-hexamethylene diisocyanate with ⅓ mol of polyethylene glycol monomethyl ether (molecular weight: 1,000), and 15 percent by mass N-methyl-2-pyrrolidone against the total mass of the two diisocyanate compounds were placed in a reaction flask to allow reaction at 90 degrees C. for two hours in a nitrogen atmosphere to obtain a prepolymer composition (solid content: 85 percent by mass).

Next, 0.2 g of a silicone defoaming agent (SE-21, manufactured by Wacker Silicon Asahi Kasei Corporation) was dissolved in 600 g of water, and 450 g of the thus-obtained prepolymer composition was dripped to the solution in 15 minutes. Subsequent to stirring at 25 degrees C. for 10 minutes, a compound represented by the following Chemical formula 1, ethylenediamine, and adipic acid hydrazide were dripped thereto, and highly pure water was added to adjust the solid content concentration, whereby a urethane resin emulsion B (solid content ratio: 35 percent by mass) was obtained. The thus-obtained urethane resin emulsion B had a glass transition temperature (Tg) of 18 degrees C.

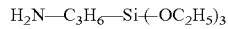  Chemical formula 1

Preparation Example 2 of Resin Emulsion

Acrylic Resin Emulsion A 28 g of methyl methacrylate, 60 g of 2-ethylhexyl acrylate, 4 g of methoxypolyethylene glycol monomethacrylate (n=23), 1.5 g of a surfactant (Aqualon HS-10, manufactured by DKS Co. Ltd.), and 34 g of deionized water were mixed and thereafter emulsified using a homomixer to obtain a uniform milky white emulsion.

Next, 89 g of deionized water was placed in a 1 litter flask equipped with a stirrer, a thermometer, a nitrogen gas introducing tube, and a reflux tube, and the temperature was raised to 70 degrees C. while introducing nitrogen. Next, 0.8 g of a 10 percent by mass aqueous solution of a surfactant (Aqualon HS-10, manufactured by DKS Co. Ltd.) and 2.6 g of a 5 percent by mass aqueous solution of ammonium persulfate were added. Thereafter, the thus-obtained emulsion was continuously dripped in 2.5 hours. Also, 0.6 g of a 15 percent by mass aqueous solution of ammonium persulfate was added every one hour from the start of the dripping of the emulsion until three hours elapsed. After completion of the dripping of the emulsion, the state at 70 degrees C. was held for two hours. Thereafter, the resultant was cooled down to 30 degrees C. and adjusted to pH 7 to 8 with a 28 percent aqueous solution of ammonia. Highly purer water was added to adjust the solid content concentration to obtain an acrylic resin emulsion A (solid content ratio: 35 percent by mass). The thus-obtained acrylic resin emulsion A had a glass transition temperature (Tg) of 22 degrees C.

Preparation Example 3 of Resin Emulsion

Acrylic Resin Emulsion C

Acrylic resin emulsion C (solid content ratio: 35 percent by mass) was prepared in the same manner as in the preparation of acrylic resin emulsion A except that the amount of methyl methacrylate was changed to 44 g and the amount of 2-ethylhexyl acrylate was changed to 44 g. The thus-obtained acrylic resin emulsion C had a glass transition temperature (Tg) of 5 degrees C.

Manufacturing Example 1 of Pre-Processing Fluid

Pre-processing Fluid 1

4 percent by mass calcium acetate monohydrate, 0.9 percent by mass urethane resin emulsion A as a solid content, 20 percent by mass 1,2-propanediol, 10 percent by mass 3-methoxy-3-methyl-1-butanol, 1 percent by mass surfactant (EMULGEN LS-106, manufactured by Kao Corporation), and 0.1 percent by mass preservatives and fungicide (Proxel LV, manufactured by Avecia Group) were mixed, and deionized water was added so as to make the total 100 percent by mass. Subsequent to mixing and stirring, the mixture was subject to filtration using a filter (Minisart, manufactured by Sartorius Stedim Biotech GmbH, pore size of 5 μm) to prepare Pre-processing Fluid 1.

Manufacturing Examples 2 to 14 of Pre-Processing Fluid

Pre-processing Fluids 2 to 14

The processing fluids 2 to 14 were prepared in the same manner as in Manufacturing Example 1 of Pre-processing Fluid except that the compositions were changed as shown in the following Tables 1 and 2. The formulation is shown in Tables 1 and 2.

The resin emulsions in Tables 1 and 2 were represented in the concentration of solid portion.

TABLE 1

| | | Pre-processing fluid | | | | | | | |
|---|---|---|---|---|---|---|---|---|---|
| | | 1 | 2 | 3 | 4 | 5 | 6 | 7 | 8 |
| Water-soluble metal compound | Calcium acetate monohydrate | 4.0 | 4.0 | 4.0 | 4.0 | 4.0 | 4.0 | — | — |
| | Calcium chloride hexahydrate | — | — | — | — | — | — | 7.0 | — |
| | Calcium nitrate tetrahydrate | — | — | — | — | — | — | — | 2.0 |
| | Magnesium sulfate (anhydride) | — | — | — | — | — | — | — | — |
| | Magnesium nitrate hexahydrate | — | — | — | — | — | — | — | — |
| | Aluminum nitrate nonahydrate | — | — | — | — | — | — | — | — |
| | Nickel(II) chloride hexahydrate | — | — | — | — | — | — | — | — |
| Resin (solid portion) | Urethane resin emulsion A (Tg of −39 degrees C.) | 0.9 | 10.0 | 21.0 | — | — | — | — | — |
| | Urethane resin emulsion B (Tg of 18 degrees C.) | — | — | — | — | — | — | — | — |
| | Acrylic resin emulsion A (Tg of 22 degrees C.) | — | — | — | 10.0 | — | — | — | — |
| | Acrylic resin emulsion B (Tg of −10 degrees C.) | — | — | — | — | — | — | 1.0 | — |
| | Acrylic resin emulsion C (Tg of 5 degrees C.) | — | — | — | — | — | — | — | 5.0 |
| | Acrylic resin emulsion D (Tg of 10 degrees C.) | — | — | — | — | — | — | — | — |
| | Vinyl acetate resin emulsion A (Tg of −30 degrees C.) | — | — | — | — | 10.0 | — | — | — |
| | Styrene butadiene resin emulsion A (Tg of −1 degrees C.) | — | — | — | — | — | 10.0 | — | — |
| Organic solvent | 1,2-Propane diol | 20.0 | 20.0 | 20.0 | 20.0 | 20.0 | 20.0 | — | 10.0 |
| | 1,2-Butane diol | — | — | — | — | — | — | 20.0 | — |
| | 2,3-Butane diol | — | — | — | — | — | — | — | 10.0 |
| | 4-methyl-1,2-pentanediol | — | — | — | — | — | — | — | 5.0 |
| | 3-methoxy-3-methyl-1-butanol | 10.0 | 10.0 | 10.0 | 10.0 | 10.0 | 10.0 | 10.0 | — |

TABLE 1-continued

|  | Pre-processing fluid | | | | | | | |
|---|---|---|---|---|---|---|---|---|
|  | 1 | 2 | 3 | 4 | 5 | 6 | 7 | 8 |
| Surfactant | 1.0 | 1.0 | 1.0 | 1.0 | 1.0 | 1.0 | 1.0 | 2.0 |
| Preservatives and fungicides | 0.1 | 0.1 | 0.1 | 0.1 | 0.1 | 0.1 | 0.1 | 0.1 |
| Water | Balance | Balance | Balance | Balance | Balance | Balance | Balance | Balance |
| Total (Percent by mass) | 100 | 100 | 100 | 100 | 100 | 100 | 100 | 100 |

TABLE 2

| | | Pre-processing fluid | | | | | |
|---|---|---|---|---|---|---|---|
| | | 9 | 10 | 11 | 12 | 13 | 14 |
| Water-soluble metal compound | Calcium acetate monohydrate | — | — | — | — | — | 4.0 |
| | Calcium chloride hexahydrate | — | — | — | — | — | — |
| | Calcium nitrate tetrahydrate | — | — | — | — | — | — |
| | Magnesium sulfate (anhydride) | 1.0 | — | — | — | — | — |
| | Magnesium nitrate hexahydrate | — | 5.0 | — | — | — | — |
| | Aluminum nitrate nonahydrate | — | — | 4.0 | — | — | — |
| | Nickel(II) chloride hexahydrate | — | — | — | 4.0 | — | — |
| Resin (solid portion) | Urethane resin emulsion A (Tg of −39 degrees C.) | — | — | 10.0 | 10.0 | 10.0 | — |
| | Urethane resin emulsion B (Tg of 18 degrees C.) | 15.0 | — | — | — | — | — |
| | Acrylic resin emulsion A (Tg of 22 degrees C.) | — | — | — | — | — | — |
| | Acrylic resin emulsion B (Tg of −10 degrees C.) | — | — | — | — | — | — |
| | Acrylic resin emulsion C (Tg of 5 degrees C.) | — | — | — | — | — | — |
| | Acrylic resin emulsion D (Tg of 10 degrees C.) | — | 20.0 | — | — | — | — |
| | Vinyl acetate resin emulsion A (Tg of −30 degrees C.) | — | — | — | — | — | — |
| | Styrene butadiene resin emulsion A (Tg of −1 degrees C.) | — | — | — | — | — | — |

TABLE 2-continued

|  |  | Pre-processing fluid | | | | | |
|---|---|---|---|---|---|---|---|
|  |  | 9 | 10 | 11 | 12 | 13 | 14 |
| Organic solvent | 1,2-Propane diol | — | — | 20.0 | 20.0 | 20.0 | 20.0 |
|  | 1,2-Butane diol | — | 20.0 | — | — | — | — |
|  | 2,3-Butane diol | 20.0 | — | — | — | — | — |
|  | 4-methyl-1,2-pentanediol | — | 2.0 | — | — | — | — |
|  | 3-methoxy-3-methyl-1-butanol | 10.0 | 10.0 | 10.0 | 10.0 | 10.0 | 10.0 |
|  | Surfactant | 1.0 | 1.0 | 1.0 | 1.0 | 1.0 | 1.0 |
|  | Preservatives and fungicides | 0.1 | 0.1 | 0.1 | 0.1 | 0.1 | 0.1 |
|  | Water | Balance | Balance | Balance | Balance | Balance | Balance |
| Total (Percent by mass) |  | 100 | 100 | 100 | 100 | 100 | 100 |

Details of the components of the pre-processing fluid shown in Tables 1 and 2 are as follows:

Multivalent Metal Salt

Calcium acetate monohydrate: manufactured by Wako Pure Chemical Industries, Ltd.

Calcium chloride hexahydrate: manufactured by Wako Pure Chemical Industries, Ltd.

Calcium nitrate tetrahydrate (manufactured by Wako Pure Chemical Industries, Ltd.)

Magnesium sulfate (anhydride, manufactured by Wako Pure Chemical Industries, Ltd.)

Magnesium nitrate hexahydrate (manufactured by Wako Pure Chemical Industries, Ltd.)

Aluminum nitrate nonahydrate (manufactured by Wako Pure Chemical Industries, Ltd.)

Nickel chloride hexahydrate (manufactured by Wako Pure Chemical Industries, Ltd.)

Resin Particle

Urethane resin emulsion A (Superflex 500M, manufactured by DKS Co. Ltd., solid content ratio of 45 percent by mass, Tg of −39 degrees C.)

Acrylic resin emulsion B (ES-600, manufactured by Japan Coating Resin Co., Ltd., solid content ratio of 45 percent by mass, Tg of −10 degrees C.)

Acrylic resin emulsion D (Mowinyl 7820, manufactured by The Nippon Synthetic Chemical Industry Co., Ltd., solid content ratio of 45 percent by mass, Tg of 10 degrees C.)

Vinyl acetate resin emulsion A (Sumikaflex 408 HQE, manufactured by Sumika Chemtex Co., Ltd., solid content ratio of 50 percent by mass, Tg of −30 degrees C.)

Styrene butadiene resin emulsion A (Nalstar SR-130, manufactured by Nippon A&L Inc., solid content ratio of 49 percent by mass, Tg of −1 degrees C.)

Surfactant

EMULGEN LS-106, manufactured by Kao Corporation

Preservatives and Fungicides

PROXEL LV, manufactured by AVECIA GROUP

Preparation Example 1 of Pigment Dispersion

Black Pigment Dispersion 1

100 g of a carbon black pigment (Black Pearls™ 1000, BET specific surface area of 343 m$^2$/g, dibutyl phthalate absorption amount of 105 mL/100 g, manufactured by Cabot Corporation) was added to 3,000 mL of sodium hypochlorite (normal concentration of 2.5 N) and the mixture was stirred at a temperature of 60 degrees C. at a speed of 300 rpm to allow reaction for 10 hours for oxidation treatment, whereby a reaction solution containing a pigment having a carboxylic group added to the surface of the carbon black was obtained. The thus-obtained reaction liquid was filtrated and the filtrated carbon black was neutralized with a sodium hydroxide solution.

Next, the reaction solution containing the carbon black pigment and deionized water were subject to ultrafiltration with a dialysis membrane. Further, the resultant was subject to ultrasonic dispersion to prepare a self-dispersible black pigment dispersion 1 (pigment solid content of 15 percent by mass).

Preparation Example 2 of Pigment Dispersion

Cyan Pigment Dispersion 1

A self-dispersible cyan pigment dispersion 1 (concentration of pigment solid portion of 15 percent by mass) was prepared in the same manner as in Preparation Example 1 of Pigment Dispersion except that the carbon black pigment was changed to Pigment Blue 15:3 (SMART Cyan 3154BA, manufactured by Sensient Technologies Corporation).

Preparation Example 3 of Pigment Dispersion

Magenta Pigment Dispersion 1

A self-dispersible magenta pigment dispersion 1 (concentration of pigment solid portion of 15 percent by mass) was prepared in the same manner as in Preparation Example 1 of Pigment Dispersion except that the carbon black pigment was changed to Pigment Red 122 (Pigment Red 122, manufactured by Sun Chemical Corporation).

Preparation Example 4 of Pigment Dispersion

Yellow Pigment Dispersion 1

A self-dispersible yellow pigment dispersion 1 (concentration of pigment solid portion: 15 percent by mass) was obtained in the same manner as in Preparation Example 1 of Pigment Dispersion except that the carbon black pigment was changed to Pigment Yellow 155 (SMART Yellow 3074BA, manufactured by Sensient Technologies Corporation).

Preparation Example 5 of Pigment Dispersion

Black Pigment Dispersion 2

After sufficient replacement with nitrogen gas in a 1 litter flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were admixed in the flask and heated to 65 degrees C. Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone was dripped into the 1 litter flask in two and a half hours. Thereafter, a liquid mixture of 0.8 g of azobismethylvaleronitrile and 18 g of methyl ethyl ketone was dripped into the 1 litter flask in 30 minutes. Subsequent to reaction at 65 degrees C. for one hour, 0.8 g of azobismethylvaleronitrile was added and the reaction was further continued for another one hour. After the completion of the reaction, 364 g of methyl ethyl ketone was added to the 1 litter flask to obtain 800 g of a polymer solution having a concentration of 50 percent by mass.

Next, 28 g of the polymer solution, 42 g of carbon black pigment (FW100, manufactured by Evonik Industries AG), 13.6 g of 1 mol/L potassium hydroxide aqueous solution, 20 g of methyl ethyl ketone, and 13.6 g of deionized water were thoroughly stirred followed by mixing and kneading using a roll mill to obtain a paste. The thus-obtained paste was placed in 200 g of pure water. Subsequent to thorough stirring, methyl ethyl ketone and water were removed using an evaporator. Furthermore, the resultant was subject to filtration under a pressure with a polyvinylidene fluoride membrane filter having an average pore diameter of 5.0 µm to obtain a resin-coated black pigment liquid dispersion 2 having a proportion of solid pigment of 15 percent by mass and a concentration of solid portion of 20 percent by mass.

Preparation Example 6 of Pigment Dispersion

Cyan Pigment Dispersion 2

A resin-coated cyan pigment dispersion 2 (proportion of solid pigment of 15 percent by mass and a concentration of solid portion of 20 percent by mass) was prepared in the same manner as in Preparation Example 5 of Pigment Dispersion except that the carbon black pigment was changed to Pigment Blue 15:3 (SMART Cyan 3154BA, manufactured by Sensient Technologies Corporation).

Preparation Example 7 of Pigment Dispersion

Magenta Pigment Dispersion 2

A resin-coated magenta pigment dispersion 2 (proportion of solid pigment of 15 percent by mass and a concentration of solid portion of 20 percent by mass) was prepared in the same manner as in Preparation Example 5 of Pigment Dispersion except that the carbon black pigment was changed to Pigment Red 122 (Pigment Red 122, manufactured by Sun Chemical Corporation).

Preparation Example 8 of Pigment Dispersion

Yellow Pigment Dispersion 2

A resin-coated yellow pigment dispersion 2 (proportion of solid pigment of 15 percent by mass and a concentration of solid portion of 20 percent by mass) was prepared in the same manner as in Preparation Example 5 of Pigment Dispersion except that the carbon black pigment was changed to Pigment Yellow 155 (SMART Yellow 3074BA, manufactured by Sensient Technologies Corporation).

Preparation Example 9 of Pigment Dispersion

Black Pigment Dispersion 3

15 g of carbon black pigment (Monarch 800, manufactured by Cabot Corporation), 2 g of an anionic surfactant (Pionin A-51-B, manufactured by Takemoto Oil & Fat Co., Ltd.), and 83 g of deionized water were mixed. Subsequent to this pre-mixing, using a bead mill (KDL type, disk type, manufactured by Shinmaru Enterprises Corporation), the liquid mixture was dispersed by circulating zirconia ball (diameter of 0.3 mm) for seven hours to obtain a dispersant-dispersing black pigment dispersion 3 (proportion of solid pigment of 15 percent by mass).

Preparation Example 10 of Pigment Dispersion

Cyan Pigment Dispersion 3

A dispersant-dispersing cyan pigment dispersion 3 (proportion of solid pigment of 15 percent by mass) was prepared in the same manner as in Preparation Example 9 of Pigment Dispersion except that the carbon black pigment was changed to Pigment Blue 15:3 (SMART Cyan 3154BA, manufactured by Sensient Technologies Corporation).

Preparation Example 11 of Pigment Dispersion

Magenta Pigment Dispersion 3

A dispersant-dispersing magenta pigment dispersion (proportion of solid pigment of 15 percent by mass) was obtained in the same manner as in Preparation Example 9 of Pigment Dispersion except that the carbon black pigment was changed to Pigment Red 122 (Pigment Red 122, manufactured by Sun Chemical Corporation).

Preparation Example 12 of Pigment Dispersion

Yellow Pigment Dispersion 3

A dispersant-dispersing yellow pigment dispersion 1 (proportion of solid pigment of 15 percent by mass) was obtained in the same manner as in Preparation Example 9 of Pigment Dispersion except that the carbon black pigment was changed to Pigment Yellow 155 (SMART Yellow 3074BA, manufactured by Sensient Technologies Corporation).

Preparation Example 1 of Ink

Black Ink 1

30 parts of Black Pigment Dispersion 1, 10 parts by mass of acrylic resin emulsion (Boncourt CF-6140, solid content ratio of 48 percent by mass, manufactured by DIC Corporation), 30 parts by mass of 1,2-propanediol, 10 parts by mass of diethylene glycol monobutylether, 1 part by mass of a surfactant (FS-300, manufactured by E. I. du Pont de Nemours and Company), 0.1 parts by mass of preservatives and fungicide (Proxel LV, manufactured by Avecia Group), and 18.9 parts of deionized water were mixed and stirred and thereafter filtered using a polypropylene filter (average pore size of 0.2 µm) to prepare black ink 1.

Manufacturing Examples 2 to 4 of Ink

Cyan Ink 1, Magenta Ink 1, and Yellow Ink 1

Cyan ink 1, magenta ink 1, and yellow ink 1 were manufactured in the same manner as in Manufacturing Example 1 of Ink except that the black pigment dispersion 1 was changed to the cyan pigment dispersion 1, the magenta pigment dispersion 1, and the yellow pigment dispersion 1, respectively.

Manufacturing Examples 5 to 8 of Ink

Black Ink 2, Cyan Ink 2, Magenta Ink 2, and Yellow Ink 2

Black ink 2, cyan ink 2, magenta ink 2, and yellow ink 2 were manufactured in the same manner as in Manufacturing Example 1 of Ink except that the black pigment dispersion 1 was changed to the black pigment dispersion 2, the cyan pigment dispersion 2, the magenta pigment dispersion 2, and the yellow pigment dispersion 2, respectively.

Manufacturing Examples 9 to 12 of Ink

Black Ink 3, Cyan Ink 3, Magenta Ink 3, and Yellow Ink 3

Black ink 3, cyan ink 3, magenta ink 3, and yellow ink 3 were manufactured in the same manner as in Manufacturing Example 1 of Ink except that the black pigment dispersion 1 was changed to the black pigment dispersion 3, the cyan pigment dispersion 3, the magenta pigment dispersion 3, and the yellow pigment dispersion 3, respectively.

Ink Set 1

Ink set 1 was prepared by a combination of the manufactured black ink 1, cyan ink 1, magenta ink 1, and yellow ink 1.

Ink Set 2

Ink set 2 was prepared by a combination of the manufactured black ink 2, cyan ink 2, magenta ink 2, and yellow ink 2.

Ink Set 3

Ink set 3 was prepared by a combination of the manufactured black ink 3, cyan ink 3, magenta ink 3, and yellow ink 3.

Example 1

Image Formation

First, an image forming device (IPSiO GXe 5500, manufactured by Ricoh Company Ltd.) employing an inkjet method was filled with each ink of the ink set 1. Next, the pre-processing fluid 1 was applied to a biaxially stretched polypropylene film (hereinafter also referred to as "OPP", Piren P-2161, manufactured by TOYOBO CO., LTD., thickness of 30 µm) and a polyethylene terephthalate film (hereinafter also referred to as "PET", ESPET® E-5100, thickness of 25 µm, manufactured by TOYOBO CO., LTD.) using a roll coater in such a manner that the application amount was 3.5 g/m². Next, immediately (within 10 seconds) after the application of the pre-processing fluid 1, each ink of the ink set 1 was applied to the non-permeable recording medium to which the pre-processing fluid 1 was applied with an ink application amount of 10.0 g/m², and the solid patch images with the individual inks were printed adjacent to each other.

Next, as the drying condition 1 in the step of accelerating drying, while pressing a printed solid patch image against a hot plate (NINOS ND-1, manufactured by AS ONE CORPORATION) set at 70 degrees C., hot air having a wind speed of 20 m/s and a temperature of 100 degrees C. was further blown from a position 1 mm away from the surface of the solid image to dry the solid patch image, whereby a printed material of Example 1 was produced.

Examples 2 to 17

Printed matter of Examples 2 to 17 were produced in the same manner as in Example 1 except that the pre-processing fluid, the ink set, the drying conditions in the step of accelerating drying, and the non-permeable recording medium were changed as shown in the following Tables 3 to 11. For each color of the ink, K represents the black ink, C represents the cyan ink, M represents the magenta ink, and Y represents the yellow ink.

As the drying condition 2 in the step of accelerating drying, while pressing a printed solid patch image against a hot plate (NINOS ND-1, manufactured by AS ONE CORPORATION) set at 70 degrees C., the solid patch image was further dried using a medium wavelength infrared ray heater (BSG 500/300, manufactured by Heraeus Holding GmbH).

As the drying condition 3 in the step of accelerating drying, a printed solid patch image was just pressed against a hot plate (NINOS ND-1, manufactured by AS ONE CORPORATION) set at 70 degrees C. to dry the solid patch image.

Comparative Examples 1 to 5

Printed matter of Comparative Examples 1 to 5 were produced in the same manner as in Example 1 except that the pre-processing fluid, the ink set, the drying conditions in the step of accelerating drying, and the non-permeable recording medium were changed as shown in the following Tables 12 to 14. For each color of the ink, K represents the black ink, C represents the cyan ink, M represents the magenta ink, and Y represents the yellow ink.

In Comparative Example 1, the pre-processing fluid was not applied.

In Comparative Example 4, drying under drying condition 1 in the step of accelerating drying was also conducted after coating the pre-processing fluid and after applying each ink of the ink set, In Comparative Example 5, a step of accelerating drying was not conducted after the ink application of each ink of the ink set.

Next, the printed matter of Examples 1 to 17 and Comparative Examples 1 to 5 were evaluated for color bleed resistance and solid image filling property. The results are shown in Tables 3 to 14.

Color Bleed Resistance

A printed solid image in the produced printed matter was visually observed, and color bleed resistance was evaluated based on the following evaluation criteria. B and higher grades are allowable.

Evaluation Criteria

A: Almost no oozing on boundary of solid image by each adjacent ink

B: Slight oozing partially occurred between adjacent ink colors

C: Slight oozing mostly occurred between adjacent ink colors

D: Severe oozing mostly occurred between adjacent ink colors, causing degradation of image quality Evaluation on Solid Image Filling Property The solid patch image in the produced printed matter was observed with a microscope (VHX-200, manufactured by Keyence Corporation) at a magnifying power of 20×, and the ratio of the ink applied area (the area to which the ink was applied to the entire area of printing portion) was measured. Insufficient ink spreading and cracking of the solid patch image ascribable to the ink flowing from the formed solid patch image were visually observed and the solid image filling property was evaluated based on the following evaluation criteria. B and higher grades are allowable.

Evaluation Criteria

A: Ratio of ink applied area was 99 percent or more

B: Ratio of ink applied area was 99 percent or more, but voids and cracking slightly occurred C: Ratio of ink applied area was from 95 to 99 percent, and voids and cracking clearly occurred D: Ratio of ink applied area was less than 95 percent, and voids and cracking clearly occurred, degrading image quality

TABLE 3

|  |  | Example 1 |  |  |  | Example 2 |  |  |  |
|---|---|---|---|---|---|---|---|---|---|
|  |  | K | C | M | Y | K | C | M | Y |
| Application amount of pre-processing fluid (g/m²) | Pre-processing fluid 1 | 3.5 |  |  |  | — |  |  |  |
|  | Pre-processing fluid 2 |  |  |  |  |  |  | 0.5 |  |
|  | Pre-processing fluid 3 | — |  |  |  | — |  |  |  |
|  | Pre-processing fluid 4 | — |  |  |  | — |  |  |  |
|  | Pre-processing fluid 5 | — |  |  |  | — |  |  |  |
|  | Pre-processing fluid 6 | — |  |  |  | — |  |  |  |
|  | Pre-processing fluid 7 | — |  |  |  | — |  |  |  |
|  | Pre-processing fluid 8 | — |  |  |  | — |  |  |  |
|  | Pre-processing fluid 9 | — |  |  |  | — |  |  |  |
|  | Pre-processing fluid 10 | — |  |  |  | — |  |  |  |
|  | Pre-processing fluid 11 | — |  |  |  | — |  |  |  |
|  | Pre-processing fluid 12 | — |  |  |  | — |  |  |  |
|  | Pre-processing fluid 13 | — |  |  |  | — |  |  |  |
|  | Pre-processing fluid 14 | — |  |  |  | — |  |  |  |
| Applied amount of ink of ink set 1 (g/m²) | Black ink 1 | 10.0 | — | — | — | 10.0 | — | — | — |
|  | Cyan Ink 1 | — | 10.0 | — | — | — | 10.0 | — | — |
|  | Magenta ink 1 | — | — | 10.0 | — | — | — | 10.0 | — |
|  | Yellow ink 1 | — | — | — | 10.0 | — | — | — | 10.0 |
| Applied amount of ink of ink set 2 (g/m²) | Black ink 2 | — | — | — | — | — | — | — | — |
|  | Cyan Ink 2 | — | — | — | — | — | — | — | — |
|  | Magenta ink 2 | — | — | — | — | — | — | — | — |
|  | Yellow ink 2 | — | — | — | — | — | — | — | — |
| Applied amount of ink of ink set 3 (g/m²) | Black ink 3 | — | — | — | — | — | — | — | — |
|  | Cyan Ink 3 | — | — | — | — | — | — | — | — |
|  | Magenta ink 3 | — | — | — | — | — | — | — | — |
|  | Yellow ink 3 | — | — | — | — | — | — | — | — |
| Dry condition | Dry condition 1 | Once |  |  |  | Once |  |  |  |
|  | Dry condition 2 | — |  |  |  | — |  |  |  |
|  | Dry condition 3 | — |  |  |  | — |  |  |  |
| Non-permeable recording medium: Evaluation result with OPP | Color bleed resistance | A |  |  |  | B |  |  |  |
|  | Solid image filling property | B |  |  |  | B |  |  |  |
| Non-permeable recording medium: Evaluation result with PET | Color bleed resistance | B |  |  |  | A |  |  |  |
|  | Solid image filling property | B |  |  |  | A |  |  |  |

TABLE 4

| | | Example | | | | | | | |
|---|---|---|---|---|---|---|---|---|---|
| | | 3 | | | | 4 | | | |
| | | K | C | M | Y | K | C | M | Y |
| Application amount of pre-processing fluid (g/m²) | Pre-processing fluid 1 | — | | | | — | | | |
| | Pre-processing fluid 2 | | 3.5 | | | | 3.5 | | |
| | Pre-processing fluid 3 | — | | | | — | | | |
| | Pre-processing fluid 4 | — | | | | — | | | |
| | Pre-processing fluid 5 | — | | | | — | | | |
| | Pre-processing fluid 6 | — | | | | — | | | |
| | Pre-processing fluid 7 | — | | | | — | | | |
| | Pre-processing fluid 8 | — | | | | — | | | |
| | Pre-processing fluid 9 | — | | | | — | | | |
| | Pre-processing fluid 10 | — | | | | — | | | |
| | Pre-processing fluid 11 | — | | | | — | | | |
| | Pre-processing fluid 12 | — | | | | — | | | |
| | Pre-processing fluid 13 | — | | | | — | | | |
| | Pre-processing fluid 14 | — | | | | — | | | |
| Applied amount of ink of ink set 1 (g/m²) | Black ink 1 | 7.5 | — | — | — | 10.0 | — | — | — |
| | Cyan Ink 1 | — | 7.5 | — | — | — | 10.0 | — | — |
| | Magenta ink 1 | — | — | 7.5 | — | — | — | 10.0 | — |
| | Yellow ink 1 | — | — | — | 7.5 | — | — | — | 10.0 |
| Applied amount of ink of ink set 2 (g/m²) | Black ink 2 | — | — | — | — | — | — | — | — |
| | Cyan Ink 2 | — | — | — | — | — | — | — | — |
| | Magenta ink 2 | — | — | — | — | — | — | — | — |
| | Yellow ink 2 | — | — | — | — | — | — | — | — |
| Applied amount of ink of ink set 3 (g/m²) | Black ink 3 | — | — | — | — | — | — | — | — |
| | Cyan Ink 3 | — | — | — | — | — | — | — | — |
| | Magenta ink 3 | — | — | — | — | — | — | — | — |
| | Yellow ink 3 | — | — | — | — | — | — | — | — |
| Dry condition | Dry condition 1 | Once | | | | Once | | | |
| | Dry condition 2 | — | | | | — | | | |
| | Dry condition 3 | — | | | | — | | | |
| Non-permeable recording medium: Evaluation result with OPP | Color bleed resistance | A | | | | A | | | |
| | Solid image filling property | B | | | | A | | | |
| Non-permeable recording medium: Evaluation result with PET | Color bleed resistance | A | | | | A | | | |
| | Solid image filling property | B | | | | A | | | |

TABLE 5

| | | Example | | | | | | | |
|---|---|---|---|---|---|---|---|---|---|
| | | 5 | | | | 6 | | | |
| | | K | C | M | Y | K | C | M | Y |
| Application amount of pre-processing fluid (g/m²) | Pre-processing fluid 1 | — | | | | — | | | |
| | Pre-processing fluid 2 | | 3.5 | | | | 3.5 | | |
| | Pre-processing fluid 3 | — | | | | — | | | |
| | Pre-processing fluid 4 | — | | | | — | | | |
| | Pre-processing fluid 5 | — | | | | — | | | |

TABLE 5-continued

|  |  | Example 5 | | | | Example 6 | | | |
| --- | --- | --- | --- | --- | --- | --- | --- | --- | --- |
|  |  | K | C | M | Y | K | C | M | Y |
|  | Pre-processing fluid 6 |  | — |  |  |  | — |  |  |
|  | Pre-processing fluid 7 |  | — |  |  |  | — |  |  |
|  | Pre-processing fluid 8 |  | — |  |  |  | — |  |  |
|  | Pre-processing fluid 9 |  | — |  |  |  | — |  |  |
|  | Pre-processing fluid 10 |  | — |  |  |  | — |  |  |
|  | Pre-processing fluid 11 |  | — |  |  |  | — |  |  |
|  | Pre-processing fluid 12 |  | — |  |  |  | — |  |  |
|  | Pre-processing fluid 13 |  | — |  |  |  | — |  |  |
|  | Pre-processing fluid 14 |  | — |  |  |  | — |  |  |
| Applied amount of ink of ink set 1 ($g/m^2$) | Black ink 1 | 14.2 | — | — | — | 10.0 | — | — | — |
|  | Cyan Ink 1 | — | 14.2 | — | — | — | 10.0 | — | — |
|  | Magenta ink 1 | — | — | 14.2 | — | — | — | 10.0 | — |
|  | Yellow ink 1 | — | — | — | 14.2 | — | — | — | 10.0 |
| Applied amount of ink of ink set 2 ($g/m^2$) | Black ink 2 | — | — | — | — | — | — | — | — |
|  | Cyan Ink 2 | — | — | — | — | — | — | — | — |
|  | Magenta ink 2 | — | — | — | — | — | — | — | — |
|  | Yellow ink 2 | — | — | — | — | — | — | — | — |
| Applied amount of ink of ink set 3 ($g/m^2$) | Black ink 3 | — | — | — | — | — | — | — | — |
|  | Cyan Ink 3 | — | — | — | — | — | — | — | — |
|  | Magenta ink 3 | — | — | — | — | — | — | — | — |
|  | Yellow ink 3 | — | — | — | — | — | — | — | — |
| Dry condition | Dry condition 1 |  | Once |  |  |  | — |  |  |
|  | Dry condition 2 |  | — |  |  |  | — |  |  |
|  | Dry condition 3 |  | — |  |  |  | Once |  |  |
| Non-permeable recording medium: Evaluation result with OPP | Color bleed resistance |  | B |  |  |  | A |  |  |
|  | Solid image filling property |  | A |  |  |  | B |  |  |
| Non-permeable recording medium: Evaluation result with PET | Color bleed resistance |  | B |  |  |  | A |  |  |
|  | Solid image filling property |  | B |  |  |  | B |  |  |

TABLE 6

|  |  | Example 7 | | | | Example 8 | | | |
| --- | --- | --- | --- | --- | --- | --- | --- | --- | --- |
|  |  | K | C | M | Y | K | C | M | Y |
| Application amount of pre-processing fluid ($g/m^2$) | Pre-processing fluid 1 |  | — |  |  |  | — |  |  |
|  | Pre-processing fluid 2 |  | 6.3 |  |  |  | — |  |  |
|  | Pre-processing fluid 3 |  | — |  |  |  | 3.5 |  |  |
|  | Pre-processing fluid 4 |  | — |  |  |  | — |  |  |
|  | Pre-processing fluid 5 |  | — |  |  |  | — |  |  |
|  | Pre-processing fluid 6 |  | — |  |  |  | — |  |  |
|  | Pre-processing fluid 7 |  | — |  |  |  | — |  |  |
|  | Pre-processing fluid 8 |  | — |  |  |  | — |  |  |
|  | Pre-processing fluid 9 |  | — |  |  |  | — |  |  |
|  | Pre-processing fluid 10 |  | — |  |  |  | — |  |  |

TABLE 6-continued

|  |  | Example 7 | | | | Example 8 | | | |
| --- | --- | --- | --- | --- | --- | --- | --- | --- | --- |
|  |  | K | C | M | Y | K | C | M | Y |
|  | Pre-processing fluid 11 | — | | | | — | | | |
|  | Pre-processing fluid 12 | — | | | | — | | | |
|  | Pre-processing fluid 13 | — | | | | — | | | |
|  | Pre-processing fluid 14 | — | | | | — | | | |
| Applied amount of ink of ink set 1 ($g/m^2$) | Black ink 1 | 10.0 | — | — | — | 10.0 | — | — | — |
|  | Cyan Ink 1 | — | 10.0 | — | — | — | 10.0 | — | — |
|  | Magenta ink 1 | — | — | 10.0 | — | — | — | 10.0 | — |
|  | Yellow ink 1 | — | — | — | 10.0 | — | — | — | 10.0 |
| Applied amount of ink of ink set 2 ($g/m^2$) | Black ink 2 | — | — | — | — | — | — | — | — |
|  | Cyan Ink 2 | — | — | — | — | — | — | — | — |
|  | Magenta ink 2 | — | — | — | — | — | — | — | — |
|  | Yellow ink 2 | — | — | — | — | — | — | — | — |
| Applied amount of ink of ink set 3 ($g/m^2$) | Black ink 3 | — | — | — | — | — | — | — | — |
|  | Cyan Ink 3 | — | — | — | — | — | — | — | — |
|  | Magenta ink 3 | — | — | — | — | — | — | — | — |
|  | Yellow ink 3 | — | — | — | — | — | — | — | — |
| Dry condition | Dry condition 1 | Once | | | | Once | | | |
|  | Dry condition 2 | — | | | | — | | | |
|  | Dry condition 3 | — | | | | — | | | |
| Non-permeable recording medium: Evaluation result with OPP | Color bleed resistance | A | | | | B | | | |
|  | Solid image filling property | B | | | | A | | | |
| Non-permeable recording medium: Evaluation result with PET | Color bleed resistance | A | | | | B | | | |
|  | Solid image filling property | B | | | | A | | | |

TABLE 7

|  |  | Example 9 | | | | Example 10 | | | |
| --- | --- | --- | --- | --- | --- | --- | --- | --- | --- |
|  |  | K | C | M | Y | K | C | M | Y |
| Application amount of pre-processing fluid ($g/m^2$) | Pre-processing fluid 1 | — | | | | — | | | |
|  | Pre-processing fluid 2 | — | | | | — | | | |
|  | Pre-processing fluid 3 | — | | | | — | | | |
|  | Pre-processing fluid 4 | | 3.5 | | | — | | | |
|  | Pre-processing fluid 5 | — | | | | | 3.5 | | |
|  | Pre-processing fluid 6 | — | | | | — | | | |
|  | Pre-processing fluid 7 | — | | | | — | | | |
|  | Pre-processing fluid 8 | — | | | | — | | | |
|  | Pre-processing fluid 9 | — | | | | — | | | |
|  | Pre-processing fluid 10 | — | | | | — | | | |
|  | Pre-processing fluid 11 | — | | | | — | | | |
|  | Pre-processing fluid 12 | — | | | | — | | | |
|  | Pre-processing fluid 13 | — | | | | — | | | |
|  | Pre-processing fluid 14 | — | | | | — | | | |

TABLE 7-continued

|  |  | Example | | | | | | | |
|---|---|---|---|---|---|---|---|---|---|
|  |  | 9 | | | | 10 | | | |
|  |  | K | C | M | Y | K | C | M | Y |
| Applied amount of ink of ink set 1 (g/m²) | Black ink 1 | 10.0 | — | — | — | 10.0 | — | — | — |
|  | Cyan Ink 1 | — | 10.0 | — | — | — | 10.0 | — | — |
|  | Magenta ink 1 | — | — | 10.0 | — | — | — | 10.0 | — |
|  | Yellow ink 1 | — | — | — | 10.0 | — | — | — | 10.0 |
| Applied amount of ink of ink set 2 (g/m²) | Black ink 2 | — | — | — | — | — | — | — | — |
|  | Cyan Ink 2 | — | — | — | — | — | — | — | — |
|  | Magenta ink 2 | — | — | — | — | — | — | — | — |
|  | Yellow ink 2 | — | — | — | — | — | — | — | — |
| Applied amount of ink of ink set 3 (g/m²) | Black ink 3 | — | — | — | — | — | — | — | — |
|  | Cyan Ink 3 | — | — | — | — | — | — | — | — |
|  | Magenta ink 3 | — | — | — | — | — | — | — | — |
|  | Yellow ink 3 | — | — | — | — | — | — | — | — |
| Dry condition | Dry condition 1 | Once | | | | Once | | | |
|  | Dry condition 2 | — | | | | — | | | |
|  | Dry condition 3 | — | | | | — | | | |
| Non-permeable recording medium: Evaluation result with OPP | Color bleed resistance | A | | | | B | | | |
|  | Solid image filling property | B | | | | B | | | |
| Non-permeable recording medium: Evaluation result with PET | Color bleed resistance | A | | | | A | | | |
|  | Solid image filling property | B | | | | B | | | |

TABLE 8

|  |  | Example | | | | | | | |
|---|---|---|---|---|---|---|---|---|---|
|  |  | 11 | | | | 12 | | | |
|  |  | K | C | M | Y | K | C | M | Y |
| Application amount of pre-processing fluid (g/m²) | Pre-processing fluid 1 | — | | | | — | | | |
|  | Pre-processing fluid 2 | — | | | | — | | | |
|  | Pre-processing fluid 3 | — | | | | — | | | |
|  | Pre-processing fluid 4 | — | | | | — | | | |
|  | Pre-processing fluid 5 | — | | | | — | | | |
|  | Pre-processing fluid 6 | 3.5 | | | | — | | | |
|  | Pre-processing fluid 7 | — | | | | 1.0 | | | |
|  | Pre-processing fluid 8 | — | | | | — | | | |
|  | Pre-processing fluid 9 | — | | | | — | | | |
|  | Pre-processing fluid 10 | — | | | | — | | | |
|  | Pre-processing fluid 11 | — | | | | — | | | |
|  | Pre-processing fluid 12 | — | | | | — | | | |
|  | Pre-processing fluid 13 | — | | | | — | | | |
|  | Pre-processing fluid 14 | — | | | | — | | | |
| Applied amount of ink of ink set 1 (g/m²) | Black ink 1 | 10.0 | — | — | — | — | — | — | — |
|  | Cyan Ink 1 | — | 10.0 | — | — | — | — | — | — |
|  | Magenta ink 1 | — | — | 10.0 | — | — | — | — | — |
|  | Yellow ink 1 | — | — | — | 10.0 | — | — | — | — |
| Applied amount of ink of ink set 2 (g/m²) | Black ink 2 | — | — | — | — | 7.0 | — | — | — |
|  | Cyan Ink 2 | — | — | — | — | — | 7.0 | — | — |
|  | Magenta ink 2 | — | — | — | — | — | — | 7.0 | — |
|  | Yellow ink 2 | — | — | — | — | — | — | — | 7.0 |

TABLE 8-continued

| | | Example | | | | | | | |
|---|---|---|---|---|---|---|---|---|---|
| | | 11 | | | | 12 | | | |
| | | K | C | M | Y | K | C | M | Y |
| Applied amount of ink of ink set 3 ($g/m^2$) | Black ink 3 | — | — | — | — | — | — | — | — |
| | Cyan Ink 3 | — | — | — | — | — | — | — | — |
| | Magenta ink 3 | — | — | — | — | — | — | — | — |
| | Yellow ink 3 | — | — | — | — | — | — | — | — |
| Dry condition | Dry condition 1 | | Once | | | | Once | | |
| | Dry condition 2 | | — | | | | — | | |
| | Dry condition 3 | | — | | | | — | | |
| Non-permeable recording medium: Evaluation result with OPP | Color bleed resistance | | B | | | | A | | |
| | Solid image filling property | | B | | | | A | | |
| Non-permeable recording medium: Evaluation result with PET | Color bleed resistance | | A | | | | A | | |
| | Solid image filling property | | B | | | | A | | |

TABLE 9

| | | Example | | | | | | | |
|---|---|---|---|---|---|---|---|---|---|
| | | 13 | | | | 14 | | | |
| | | K | C | M | Y | K | C | M | Y |
| Application amount of pre-processing fluid ($g/m^2$) | Pre-processing fluid 1 | | — | | | | — | | |
| | Pre-processing fluid 2 | | — | | | | — | | |
| | Pre-processing fluid 3 | | — | | | | — | | |
| | Pre-processing fluid 4 | | — | | | | — | | |
| | Pre-processing fluid 5 | | — | | | | — | | |
| | Pre-processing fluid 6 | | — | | | | — | | |
| | Pre-processing fluid 7 | | — | | | | — | | |
| | Pre-processing fluid 8 | | 4.7 | | | | — | | |
| | Pre-processing fluid 9 | | — | | | | 5.9 | | |
| | Pre-processing fluid 10 | | — | | | | — | | |
| | Pre-processing fluid 11 | | — | | | | — | | |
| | Pre-processing fluid 12 | | — | | | | — | | |
| | Pre-processing fluid 13 | | — | | | | — | | |
| | Pre-processing fluid 14 | | — | | | | — | | |
| Applied amount of ink of ink set 1 ($g/m^2$) | Black ink 1 | — | — | — | — | — | — | — | — |
| | Cyan Ink 1 | — | — | — | — | — | — | — | — |
| | Magenta ink 1 | — | — | — | — | — | — | — | — |
| | Yellow ink 1 | — | — | — | — | — | — | — | — |
| Applied amount of ink of ink set 2 ($g/m^2$) | Black ink 2 | — | — | — | — | 14.0 | — | — | — |
| | Cyan Ink 2 | — | — | — | — | — | 14.0 | — | — |
| | Magenta ink 2 | — | — | — | — | — | — | 14.0 | — |
| | Yellow ink 2 | — | — | — | — | — | — | — | 14.0 |
| Applied amount of ink of ink set 3 ($g/m^2$) | Black ink 3 | 12.0 | — | — | — | — | — | — | — |
| | Cyan Ink 3 | — | 12.0 | — | — | — | — | — | — |
| | Magenta ink 3 | — | — | 12.0 | — | — | — | — | — |
| | Yellow ink 3 | — | — | — | 12.0 | — | — | — | — |
| Dry condition | Dry condition 1 | | — | | | | — | | |
| | Dry condition 2 | | Once | | | | Once | | |
| | Dry condition 3 | | — | | | | — | | |

TABLE 9-continued

| | | Example | | | | | | | |
|---|---|---|---|---|---|---|---|---|---|
| | | 13 | | | | 14 | | | |
| | | K | C | M | Y | K | C | M | Y |
| Non-permeable recording medium: Evaluation result with OPP | Color bleed resistance | | | A | | | | A | |
| | Solid image filling property | | | A | | | | A | |
| Non-permeable recording medium: Evaluation result with PET | Color bleed resistance | | | A | | | | A | |
| | Solid image filling property | | | A | | | | A | |

TABLE 10

| | | Example | | | | | | | |
|---|---|---|---|---|---|---|---|---|---|
| | | 15 | | | | 16 | | | |
| | | K | C | M | Y | K | C | M | Y |
| Application amount of pre-processing fluid (g/m$^2$) | Pre-processing fluid 1 | — | | | | — | | | |
| | Pre-processing fluid 2 | — | | | | — | | | |
| | Pre-processing fluid 3 | — | | | | — | | | |
| | Pre-processing fluid 4 | — | | | | — | | | |
| | Pre-processing fluid 5 | — | | | | — | | | |
| | Pre-processing fluid 6 | — | | | | — | | | |
| | Pre-processing fluid 7 | — | | | | — | | | |
| | Pre-processing fluid 8 | — | | | | — | | | |
| | Pre-processing fluid 9 | — | | | | — | | | |
| | Pre-processing fluid 10 | | 2.8 | | | — | | | |
| | Pre-processing fluid 11 | — | | | | | 3.5 | | |
| | Pre-processing fluid 12 | — | | | | — | | | |
| | Pre-processing fluid 13 | — | | | | — | | | |
| | Pre-processing fluid 14 | — | | | | — | | | |
| Applied amount of ink of ink set 1 (g/m$^2$) | Black ink 1 | 8.5 | — | — | — | 10.0 | — | — | — |
| | Cyan Ink 1 | — | 8.5 | — | — | — | 10.0 | — | — |
| | Magenta ink 1 | — | — | 8.5 | — | — | — | 10.0 | — |
| | Yellow ink 1 | — | — | — | 8.5 | — | — | — | 10.0 |
| Applied amount of ink of ink set 2 (g/m$^2$) | Black ink 2 | — | — | — | — | — | — | — | — |
| | Cyan Ink 2 | — | — | — | — | — | — | — | — |
| | Magenta ink 2 | — | — | — | — | — | — | — | — |
| | Yellow ink 2 | — | — | — | — | — | — | — | — |
| Applied amount of ink of ink set 3 (g/m$^2$) | Black ink 3 | — | — | — | — | — | — | — | — |
| | Cyan Ink 3 | — | — | — | — | — | — | — | — |
| | Magenta ink 3 | — | — | — | — | — | — | — | — |
| | Yellow ink 3 | — | — | — | — | — | — | — | — |
| Dry condition | Dry condition 1 | Once | | | | Once | | | |
| | Dry condition 2 | — | | | | — | | | |
| | Dry condition 3 | — | | | | — | | | |
| Non-permeable recording medium: Evaluation result with OPP | Color bleed resistance | | | A | | | | B | |
| | Solid image filling property | | | A | | | | B | |
| Non-permeable recording medium: Evaluation result with PET | Color bleed resistance | | | A | | | | B | |
| | Solid image filling property | | | A | | | | B | |

TABLE 11

|  |  | Example 17 |  |  |  |
|---|---|---|---|---|---|
|  |  | K | C | M | Y |
| Application amount of pre-processing fluid (g/m²) | Pre-processing fluid 1 | — | | | |
|  | Pre-processing fluid 2 | — | | | |
|  | Pre-processing fluid 3 | — | | | |
|  | Pre-processing fluid 4 | — | | | |
|  | Pre-processing fluid 5 | — | | | |
|  | Pre-processing fluid 6 | — | | | |
|  | Pre-processing fluid 7 | — | | | |
|  | Pre-processing fluid 8 | — | | | |
|  | Pre-processing fluid 9 | — | | | |
|  | Pre-processing fluid 10 | — | | | |
|  | Pre-processing fluid 11 | — | | | |
|  | Pre-processing fluid 12 | | 3.5 | | |
|  | Pre-processing fluid 13 | — | | | |
|  | Pre-processing fluid 14 | — | | | |
| Applied amount of ink of ink set 1 (g/m²) | Black ink 1 | 10.0 | — | — | — |
|  | Cyan Ink 1 | — | 10.0 | — | — |
|  | Magenta ink 1 | — | — | 10.0 | — |
|  | Yellow ink 1 | — | — | — | 10.0 |
| Applied amount of ink of ink set 2 (g/m²) | Black ink 2 | — | — | — | — |
|  | Cyan Ink 2 | — | — | — | — |
|  | Magenta ink 2 | — | — | — | — |
|  | Yellow ink 2 | — | — | — | — |
| Applied amount of ink of ink set 3 (g/m²) | Black ink 3 | — | — | — | — |
|  | Cyan Ink 3 | — | — | — | — |
|  | Magenta ink 3 | — | — | — | — |
|  | Yellow ink 3 | — | — | — | — |
| Dry condition | Dry condition 1 | | Once | | |
|  | Dry condition 2 | | — | | |
|  | Dry condition 3 | | — | | |
| Non-permeable recording medium: Evaluation result with OPP | Color bleed resistance | | B | | |
|  | Solid image filling property | | B | | |
| Non-permeable recording medium: Evaluation result with PET | Color bleed resistance | | B | | |
|  | Solid image filling property | | B | | |

TABLE 12

|  |  | Comparative Example |  |  |  |  |  |  |  |
|---|---|---|---|---|---|---|---|---|---|
|  |  | 1 | | | | 2 | | | |
|  |  | K | C | M | Y | K | C | M | Y |
| Application amount of pre-processing fluid (g/m²) | Pre-processing fluid 1 | | — | | | | — | | |
|  | Pre-processing fluid 2 | | — | | | | — | | |
|  | Pre-processing fluid 3 | | — | | | | — | | |
|  | Pre-processing fluid 4 | | — | | | | — | | |
|  | Pre-processing fluid 5 | | — | | | | — | | |
|  | Pre-processing fluid 6 | | — | | | | — | | |
|  | Pre-processing fluid 7 | | — | | | | — | | |
|  | Pre-processing fluid 8 | | — | | | | — | | |
|  | Pre-processing fluid 9 | | — | | | | — | | |
|  | Pre-processing fluid 10 | | — | | | | — | | |
|  | Pre-processing fluid 11 | | — | | | | — | | |
|  | Pre-processing fluid 12 | | — | | | | — | | |
|  | Pre-processing fluid 13 | | — | | | | | 3.5 | | |
|  | Pre-processing fluid 14 | | — | | | | — | | |
| Applied amount of ink of ink set 1 (g/m²) | Black ink 1 | 10.0 | — | — | — | 10.0 | — | — | — |
|  | Cyan Ink 1 | — | 10.0 | — | — | — | 10.0 | — | — |
|  | Magenta ink 1 | — | — | 10.0 | — | — | — | 10.0 | — |
|  | Yellow ink 1 | — | — | — | 10.0 | — | — | — | 10.0 |
| Applied amount of ink of ink set 2 (g/m²) | Black ink 2 | — | — | — | — | — | — | — | — |
|  | Cyan Ink 2 | — | — | — | — | — | — | — | — |
|  | Magenta ink 2 | — | — | — | — | — | — | — | — |
|  | Yellow ink 2 | — | — | — | — | — | — | — | — |

TABLE 12-continued

|  |  | Comparative Example | | | | | | | |
|---|---|---|---|---|---|---|---|---|---|
|  |  | 1 | | | | 2 | | | |
|  |  | K | C | M | Y | K | C | M | Y |
| Applied amount of ink of ink set 3 (g/m²) | Black ink 3 | — | — | — | — | — | — | — | — |
|  | Cyan Ink 3 | — | — | — | — | — | — | — | — |
|  | Magenta ink 3 | — | — | — | — | — | — | — | — |
|  | Yellow ink 3 | — | — | — | — | — | — | — | — |
| Dry condition | Dry condition 1 | Once | | | | Once | | | |
|  | Dry condition 2 | — | | | | — | | | |
|  | Dry condition 3 | — | | | | — | | | |
| Non-permeable recording medium: Evaluation result with OPP | Color bleed resistance | D | | | | D | | | |
|  | Solid image filling property | C | | | | C | | | |
| Non-permeable recording medium: Evaluation result with PET | Color bleed resistance | D | | | | C | | | |
|  | Solid image filling property | A | | | | A | | | |

TABLE 13

|  |  | Comparative Example | | | | | | | |
|---|---|---|---|---|---|---|---|---|---|
|  |  | 3 | | | | 4 | | | |
|  |  | K | C | M | Y | K | C | M | Y |
| Application amount of pre-processing fluid (g/m²) | Pre-processing fluid 1 | — | | | | — | | | |
|  | Pre-processing fluid 2 | — | | | | 3.5 | | | |
|  | Pre-processing fluid 3 | — | | | | — | | | |
|  | Pre-processing fluid 4 | — | | | | — | | | |
|  | Pre-processing fluid 5 | — | | | | — | | | |
|  | Pre-processing fluid 6 | — | | | | — | | | |
|  | Pre-processing fluid 7 | — | | | | — | | | |
|  | Pre-processing fluid 8 | — | | | | — | | | |
|  | Pre-processing fluid 9 | — | | | | — | | | |
|  | Pre-processing fluid 10 | — | | | | — | | | |
|  | Pre-processing fluid 11 | — | | | | — | | | |
|  | Pre-processing fluid 12 | — | | | | — | | | |
|  | Pre-processing fluid 13 | — | | | | — | | | |
|  | Pre-processing fluid 14 | 3.5 | | | | — | | | |
| Applied amount of ink of ink set 1 (g/m²) | Black ink 1 | 10.0 | — | — | — | 10.0 | — | — | — |
|  | Cyan Ink 1 | — | 10.0 | — | — | — | 10.0 | — | — |
|  | Magenta ink 1 | — | — | 10.0 | — | — | — | 10.0 | — |
|  | Yellow ink 1 | — | — | — | 10.0 | — | — | — | 10.0 |
| Applied amount of ink of ink set 2 (g/m²) | Black ink 2 | — | — | — | — | — | — | — | — |
|  | Cyan Ink 2 | — | — | — | — | — | — | — | — |
|  | Magenta ink 2 | — | — | — | — | — | — | — | — |
|  | Yellow ink 2 | — | — | — | — | — | — | — | — |
| Applied amount of ink of ink set 3 (g/m²) | Black ink 3 | — | — | — | — | — | — | — | — |
|  | Cyan Ink 3 | — | — | — | — | — | — | — | — |
|  | Magenta ink 3 | — | — | — | — | — | — | — | — |
|  | Yellow ink 3 | — | — | — | — | — | — | — | — |
| Dry condition | Dry condition 1 | Once | | | | Twice | | | |
|  | Dry condition 2 | — | | | | — | | | |
|  | Dry condition 3 | — | | | | — | | | |
| Non-permeable recording medium: Evaluation result with OPP | Color bleed resistance | A | | | | A | | | |
|  | Solid image filling property | D | | | | C | | | |

TABLE 13-continued

| | | Comparative Example | | | | | | |
|---|---|---|---|---|---|---|---|---|
| | | 3 | | | | 4 | | |
| | | K | C | M | Y | K | C | M | Y |
| Non-permeable recording medium: Evaluation result with PET | Color bleed resistance | A | | | | A | | | |
| | Solid image filling property | D | | | | C | | | |

TABLE 14

| | | Comparative Example 5 | | | |
|---|---|---|---|---|---|
| | | K | C | M | Y |
| Application amount of pre-processing fluid (g/m²) | Pre-processing fluid 1 | — | | | |
| | Pre-processing fluid 2 | | 3.5 | | |
| | Pre-processing fluid 3 | — | | | |
| | Pre-processing fluid 4 | — | | | |
| | Pre-processing fluid 5 | — | | | |
| | Pre-processing fluid 6 | — | | | |
| | Pre-processing fluid 7 | — | | | |
| | Pre-processing fluid 8 | — | | | |
| | Pre-processing fluid 9 | — | | | |
| | Pre-processing fluid 10 | — | | | |
| | Pre-processing fluid 11 | — | | | |
| | Pre-processing fluid 12 | — | | | |
| | Pre-processing fluid 13 | — | | | |
| | Pre-processing fluid 14 | — | | | |
| Applied amount of ink of ink set 1 (g/m²) | Black ink 1 | 10.0 | — | — | — |
| | Cyan Ink 1 | — | 10.0 | — | — |
| | Magenta ink 1 | — | — | 10.0 | — |
| | Yellow ink 1 | — | — | — | 10.0 |
| Applied amount of ink of ink set 2 (g/m²) | Black ink 2 | — | — | — | — |
| | Cyan Ink 2 | — | — | — | — |
| | Magenta ink 2 | — | — | — | — |
| | Yellow ink 2 | — | — | — | — |
| Applied amount of ink of ink set 3 (g/m²) | Black ink 3 | — | — | — | — |
| | Cyan Ink 3 | — | — | — | — |
| | Magenta ink 3 | — | — | — | — |
| | Yellow ink 3 | — | — | — | — |
| Dry condition | Dry condition 1 | — | | | |
| | Dry condition 2 | — | | | |
| | Dry condition 3 | — | | | |
| Non-permeable recording medium: Evaluation result with OPP | Color bleed resistance | B | | | |
| | Solid image filling property | C | | | |
| Non-permeable recording medium: Evaluation result with PET | Color bleed resistance | B | | | |
| | Solid image filling property | C | | | |

Aspects of the present disclosure are, for example, as follows.

1. An image forming method includes applying a pre-processing fluid to a non-permeable recording medium, jetting an ink to the non-permeable recording medium, and accelerating drying the pre-processing fluid and the ink the non-permeable recording medium, wherein the pre-processing fluid contains a multivalent metal salt and a resin particle.
2. The image forming method according to 1 mentioned above, wherein the time from the completion of the application of the pre-processing fluid onto the non-permeable recording medium to the start of application of the ink is 10 seconds or less.
3. The image forming method according to 1 or 2 mentioned above, wherein the application amount of the pre-processing fluid is from 1 to 6 g/m².
4. The image forming method according to any one of 1 to 3 mentioned above, wherein the resin particle is at least one of a urethane resin particle having a glass transition temperature of 20 degrees C. or lower and an acrylic resin particle having a glass transition temperature of 20 degrees C. or lower.
5. The image forming method according to any one of 1 to 4 mentioned above, wherein the amount of the resin particle accounts for 1 to 20 percent by mass of the total amount of the pre-processing fluid.
6. The image forming method according to any one of 1 to 5 mentioned above, wherein the multivalent metal salt is at least one of a calcium salt and a magnesium salt.
7. The image forming method according to any one of 1 to 6 mentioned above, wherein the non-permeable recording medium is any one of a polypropylene film, a polyethylene terephthalate film, and a nylon film.
8. The image forming method according to any one of 1 to 7 mentioned above, wherein the application amount of the ink is from 4 to 14 g/m².
9. The image forming method according to any one of 1 to 8 mentioned above, wherein the ink contains a pigment.
10. The image forming method according to 9 mentioned above, wherein the pigment is any one of a self-dispersible pigment, a resin-coated pigment, and a dispersant-dispersing pigment.
11. The image forming method according to any one of 1 to 10 mentioned above, wherein the ink contains an organic solvent.
12. The image forming method according to 11 mentioned above, wherein the organic solvent is at least any one of 1,2-propanediol, 1,2-butanediol, and 2,3-butanediol.
13. The image forming method according to any one of 1 to 12 mentioned above, wherein a drying device is used to accelerate drying the ink and the pre-processing fluid.
14. The image forming method according to any one of 1 to 13 mentioned above, wherein at least any one of heated wind and infrared is used to accelerate drying the ink and the pre-processing fluid.
15. The image forming method according to any one of 1 to 14 mentioned above, wherein the temperature in the accelerating drying the ink and the pre-processing fluid is from 40 to 100 degrees C.

16. The image forming method according to any one of 1 to 15 mentioned above, further includes a surface reforming step.
17. An image forming device includes a pre-processing fluid applying device to apply a pre-processing fluid to a non-permeable recording medium, an inkjet device to jet an ink to the non-permeable recording medium, and a drying accelerating device to accelerate drying the pre-processing fluid applied to and the ink jetted to the non-permeable recording medium, wherein the pre-processing fluid contains a multivalent metal salt and a resin particle.
18. The image forming method according to 17 mentioned above, further includes a surface reforming device.
19. A method of manufacturing printed matter, utilizing the image forming method of any one of 1 to 16 mentioned above.

According to the present disclosure, an image forming method is provided which is capable of producing printed matter with less color bleed and good solid image filling property when ink is applied onto a non-permeable recording medium where a pre-processing fluid is attached undried

Having now fully described embodiments of the present invention, it will be apparent to one of ordinary skill in the art that many changes and modifications can be made thereto without departing from the spirit and scope of embodiments of the invention as set forth herein.

What is claimed is:

1. An image forming method comprising:
    applying a pre-processing fluid to a non-permeable recording medium;
    jetting an ink to the non-permeable recording medium;
    applying a post-processing fluid to the non-permeable recording medium; and
    accelerating drying at a same time with a same drying device each of the pre-processing fluid applied to the non-permeable recording medium, the ink jetted to the non-permeable recording medium, and the post-processing fluid,
    wherein the pre-processing fluid comprises a multivalent metal salt and a resin particle, and
    wherein the non-permeable recording medium has a water-absorption amount of 10 mL/m$^2$ or less between an initiation of contact and 30 msec$^{1/2}$ thereafter according to a Bristow method.

2. The image forming method according to claim 1, wherein an amount of the pre-processing fluid applied to the non-permeable recording medium is from 1 to 6 g/m$^2$.
3. The image forming method according to claim 1, wherein the resin particle is at least one of a urethane resin particle having a glass transition temperature of 20 degrees C. or lower and an acrylic resin particle having a glass transition temperature of 20 degrees C. or lower.
4. The image forming method according to claim 1, wherein the resin particle accounts for 1 to 20 percent by mass of a total amount of the pre-processing fluid.
5. The image forming method according to claim 1, wherein the multivalent metal salt comprises at least one of a calcium salt and a magnesium salt.
6. The image forming method according to claim 1, wherein an amount of the ink applied to the non-permeable recording medium is from 4 to 14 g/m$^2$.
7. The image forming method according to claim 1, wherein at least one of heated wind and infrared is used to accelerate drying the ink and the pre-processing fluid.
8. A method of manufacturing printed matter, utilizing the image forming method of claim 1.
9. The image forming method according to claim 1, wherein the post-processing fluid forms a transparent protection layer on the non-permeable recording medium.
10. An image forming device comprising:
    a pre-processing fluid applying device configured to apply a pre-processing fluid to a non-permeable recording medium;
    an inkjet device configured to jet an ink to the non-permeable recording medium;
    a post-processing fluid applying device configured to apply a post-processing fluid to the non-permeable recording medium; and
    a drying accelerating device configured to accelerate drying at a same time each of the pre-processing fluid applied to the non-permeable recording medium, the ink jetted to the non-permeable recording medium, and the post-processing fluid,
    wherein the pre-processing fluid comprises a multivalent metal salt and a resin particle, and
    wherein the non-permeable recording medium has a water-absorption amount of 10 mL/m$^2$ or less between an initiation of contact and 30 msec$^{1/2}$ thereafter according to a Bristow method.

* * * * *